United States Patent
Kadoto et al.

(10) Patent No.: US 10,531,094 B2
(45) Date of Patent: Jan. 7, 2020

(54) IMAGE PROCESSING DEVICE AND MOVING IMAGE TRANSMISSION METHOD

(71) Applicant: Hitachi Kokusai Electric Inc., Tokyo (JP)

(72) Inventors: Tadakazu Kadoto, Tokyo (JP); Masatoshi Kondo, Tokyo (JP); Muneaki Yamaguchi, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 361 days.

(21) Appl. No.: 15/205,182

(22) Filed: Jul. 8, 2016

(65) Prior Publication Data
US 2016/0323583 A1 Nov. 3, 2016

Related U.S. Application Data

(63) Continuation of application No. PCT/JP2014/083284, filed on Dec. 16, 2014.

(30) Foreign Application Priority Data

Jan. 9, 2014 (JP) ................................ 2014-002105

(51) Int. Cl.
*H04N 19/14* (2014.01)
*H04N 19/172* (2014.01)
(Continued)

(52) U.S. Cl.
CPC ........... *H04N 19/14* (2014.11); *H04N 19/117* (2014.11); *H04N 19/132* (2014.11);
(Continued)

(58) Field of Classification Search
CPC .... H04N 19/14; H04N 19/117; H04N 19/132; H04N 19/172; H04N 19/46; H04N 19/59
See application file for complete search history.

(56) References Cited

U.S. PATENT DOCUMENTS

| | | | |
|---|---|---|---|
| 5,930,397 A | 7/1999 | Tsujii et al. | |
| 2007/0074266 A1* | 3/2007 | Raveendran | H04N 5/144 725/135 |

(Continued)

FOREIGN PATENT DOCUMENTS

| | | | |
|---|---|---|---|
| JP | S61-247183 A | 11/1986 | |
| JP | H06-062394 A | 3/1994 | |

(Continued)

OTHER PUBLICATIONS

International Search Report dated Mar. 24, 2015.

*Primary Examiner* — Jamie J Atala
*Assistant Examiner* — Hesham K Abouzahra
(74) *Attorney, Agent, or Firm* — Bacon & Thomas, PLLC

(57) ABSTRACT

Provided is an image processing device which performs scaling and applies super-resolution in accordance with the complexity of the image. On the compression side, a complexity calculation unit calculates the transmission image complexity, which indicates the complexity of the input image, multiplexes and outputs it to an encoded stream, and a control unit configures the cutoff frequency of a low pass filter and the scaling coefficient of an image reduction unit in accordance with the transmission image complexity. On the decompression side, a complexity calculation unit calculates the decoded image complexity indicating the complexity of a decoded and expanded image, a complexity comparison unit compares the transmission image complexity and the decoded image complexity and outputs the difference or ratio, and, on the basis of output, a parameter calculation unit optimizes and configures the scaling coefficient of an image enlargement unit and the folding frequency of a super-resolution processing unit.

3 Claims, 19 Drawing Sheets

US 10,531,094 B2
Page 2

(51) Int. Cl.
*H04N 19/46* (2014.01)
*H04N 19/117* (2014.01)
*H04N 19/132* (2014.01)
*H04N 19/59* (2014.01)

(52) U.S. Cl.
CPC .......... *H04N 19/172* (2014.11); *H04N 19/46* (2014.11); *H04N 19/59* (2014.11)

(56) References Cited

U.S. PATENT DOCUMENTS

2010/0119157 A1* 5/2010 Kameyama .......... H04N 19/115
382/195
2012/0236183 A1 9/2012 Hiramatsu et al.

FOREIGN PATENT DOCUMENTS

| | | | |
|---|---|---|---|
| JP | H06-233266 A | | 8/1994 |
| JP | H07-177513 A | | 7/1995 |
| JP | H07177513 | * | 7/1995 |
| JP | H09-070044 A | | 3/1997 |
| JP | 4245576 B2 | | 3/2009 |
| JP | 2012-151562 A | | 8/2012 |
| JP | 2012-155573 A | | 8/2012 |
| JP | 2012-195908 A | | 10/2012 |
| JP | 2014-096745 A | | 5/2014 |
| JP | WO2013191193 | * | 5/2016 |
| WO | 2010/137323 A1 | | 12/2010 |
| WO | 2013/191193 A1 | | 12/2013 |

\* cited by examiner

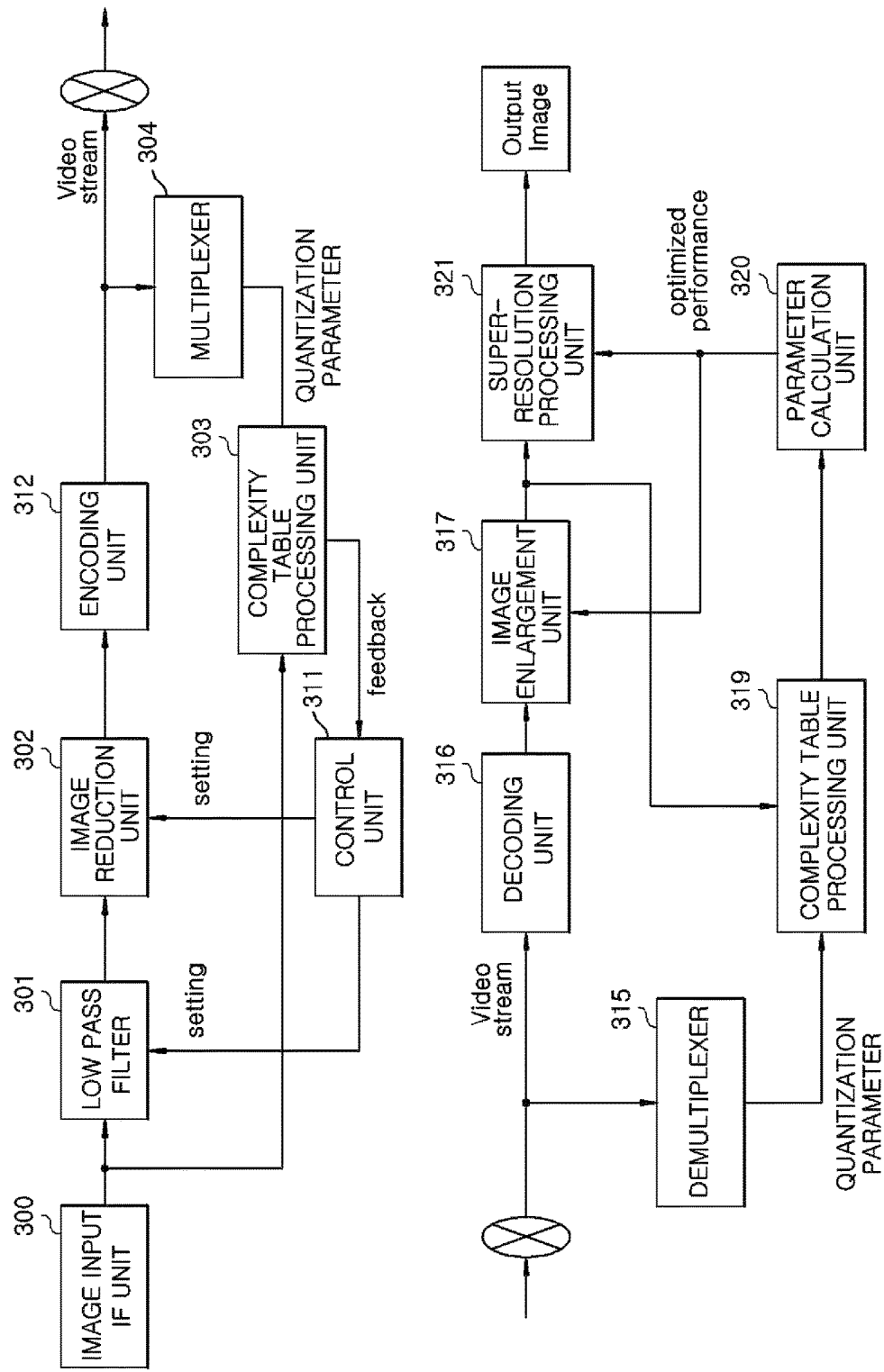

MOTION VECTOR ACCOMPANIED
BY IMAGE REDUCTION

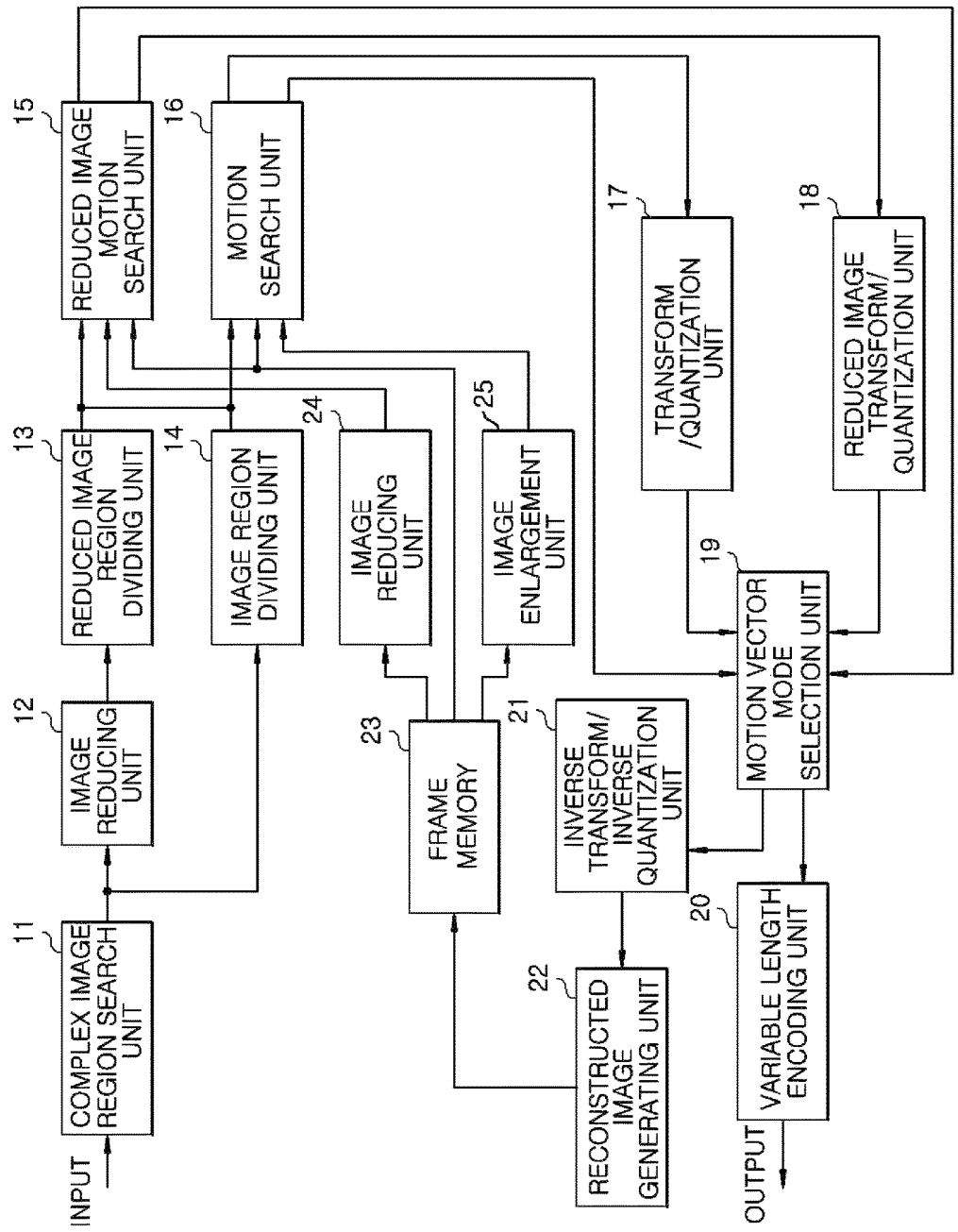

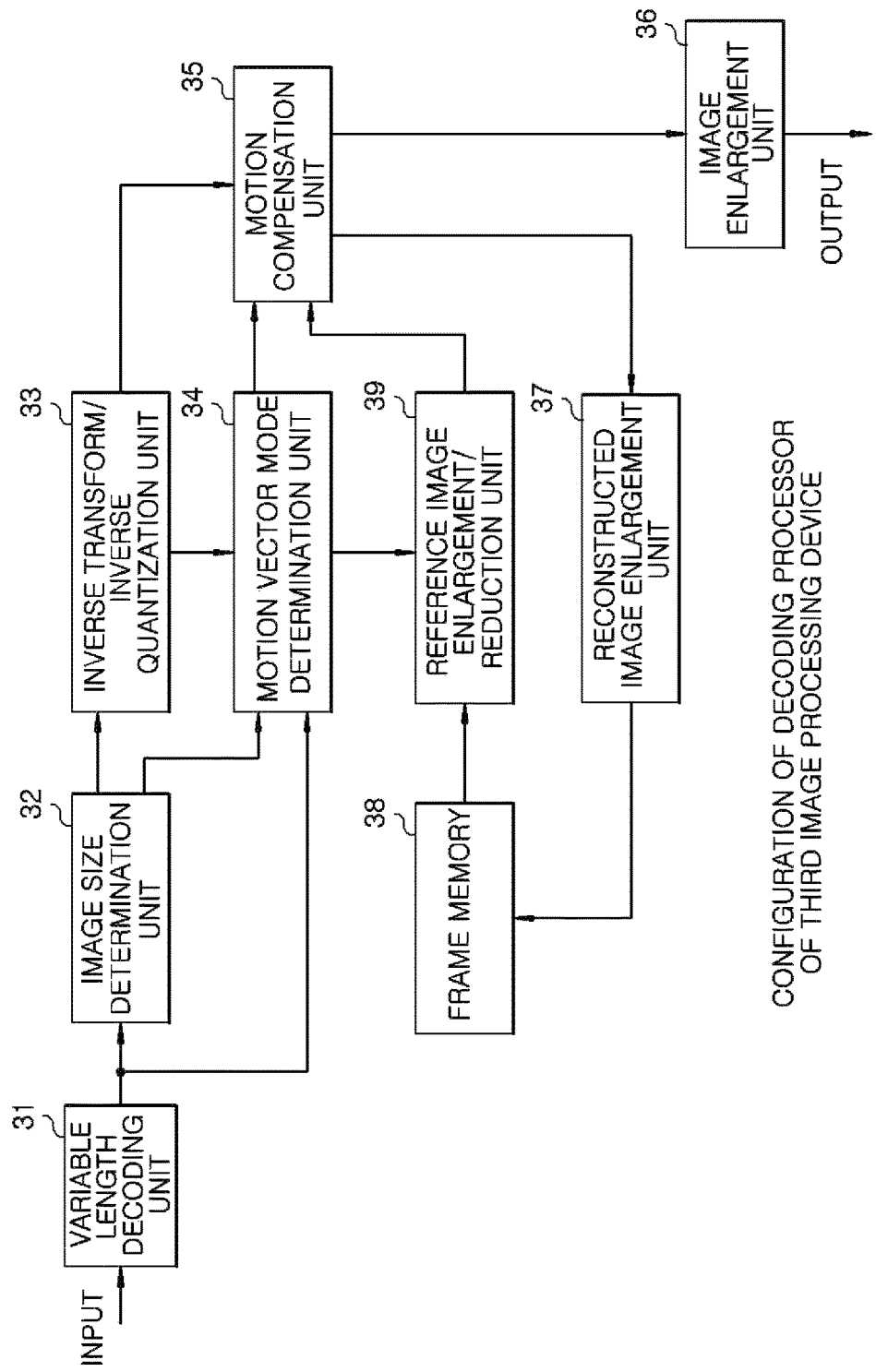

EXAMPLE OF TRANSFORM
QUANTIZATION OF REDUCED IMAGE

PROCESSING IN ENCODING PROCESSOR

PROCESSING IN DECODING PROCESSOR

DECODING PROCESS A

FIG.19

| | NO FRAME REDUCTION | | FRAME REDUCTION | |
|---|---|---|---|---|
| | NO MOTION VECTOR REDUCTION | MOTION VECTOR REDUCTION | NO MOTION VECTOR REDUCTION | MOTION VECTOR REDUCTION |
| MB SIZE | 16x16 | 16x16 | 16x16 | 16x16 |
| SIZE DURING MC | 16x16 | 8x8 | 16x16 | 8x8 |
| SIZE IN ORIGINAL IMAGE | 16x16 | 16x16 | 32x32 | 32x32 |
| RECONSTRUCTED DIFFERENCE IMAGE | 16x16->16x16 | 16x16->8x8 | 16x16->16x16 | 16x16->8x8 |
| NO REFERENCE IMAGE REDUCTION | 16x16->16x16 | 16x16->8x8 | 32x32->16x16 | 32x32->8x8 |
| REFERENCE IMAGE REDUCTION | 8x8->16x16 | 8x8->8x8 | 16x16->16x16 | 16x16->8x8 |

IMAGE PROCESSING DEVICE AND MOVING IMAGE TRANSMISSION METHOD

This application is a Continuation application of PCT International Application No. PCT/JP2014/083284 filed on Dec. 16, 2014, which designated the United States.

FIELD OF THE INVENTION

The present invention relates to an image processing device and a moving image transmission method, and more particularly to an image processing device which can reproduce a high-quality image on the reception side even when the image is transmitted at a low bandwidth.

BACKGROUND OF THE INVENTION

Recently, the amount of data for image transmission has been increasing day by day, for example, under the influence of terrestrial digital television broadcasting that has been in service since 2011. The image resolution to be used generally has changed from analog resolution (720 pix×480 pix) used so far to full high-definition (HD) resolution (1920 pix×1080 pix).

Also in a monitoring camera used at various locations such as stations, airports, buildings or rivers, a high-definition CCD or CMOS sensor is used, and the resolution is remarkably improved from the conventional analog resolution.

Therefore, a high-quality image can be photographed and transmitted, but the transmission bandwidth required increases. In the case of transmitting a full HD image in an uncompressed manner, the transmission bandwidth of about 1.5 Gbps is required. In the transmission through a packet switching network, since even an optical fiber that is widely used as a current home broadband has a bandwidth of about 100 Mbps, the full HD image cannot be transmitted in an uncompressed manner.

Thus, it is necessary to compress the data to a transmittable bandwidth. Currently, H.264 and H.265 may be used as high-efficiency compression technology standards. These standards are international standards of moving image encoding.

In a compression technique, the transmission bandwidth and the image quality are in a trade-off relationship. In the case of high compression for low bandwidth transmission, a deterioration in image quality occurs. Accordingly, it is required to obtain a high-quality image even when the image is transmitted at a low bandwidth. Therefore, a super-resolution technique has been attracting attention to achieve a high resolution by digital image processing.

FIG. 20 is a schematic block diagram of an image transmission system having a general image processing device. As shown in FIG. 20, the image transmission system includes a video encoder 1 as a configuration of the transmission side. Further, the image transmission system includes a video decoder 2 and a super-resolution processing unit 3 as a configuration of the reception side.

In the example of FIG. 20, only the configuration used for transmission is illustrated in the image processing device on the transmission side, and only the configuration used for reception is illustrated in the image processing device on the reception side.

The video encoder 1 on the transmission side encodes an image inputted from an image input device such as a CCD (charge-coupled device) camera in a coding scheme (e.g., H.264), and outputs the encoded image data to a transmission path such as an IP network or a coaxial cable network.

The video decoder 2 on the reception side decodes the image data received through the transmission path in a scheme corresponding to the coding scheme in the video encoder 1.

The super-resolution processing unit 3 performs a super-resolution process on the decoded image to obtain an image having a higher resolution as an output image.

In the coding scheme such as H.264 or H.265, various coding tools have been defined. Accordingly, it is possible to improve the image quality by performing flexible adjustment according to the transmission bandwidth. Then, at the video decoder side, it is possible to improve the image quality by performing a super-resolution process on the image with less degradation in image quality.

However, for example, in the case of using an encoder capable of specifying only the bit rate and the image size, since fine adjustment of a compression process cannot be performed, a degradation in image quality occurs. Therefore, even if a super-resolution process is performed at the decoder side, an image quality improvement effect cannot be expected.

(Compression in Encoding Moving Image Data)

An improvement of the compression ratio in encoding the moving image will now be described. A moving image encoding method has been practically used by developing a moving image encoding system which is represented by MPEG (Moving Picture Experts Group). Further, in order to improve the compression efficiency, for example, there has been proposed a technology for improving the efficiency of orthogonal transformation, a quantization process and a variable length coding process of the next stage by using a difference value between a predicted value and a pixel value using intra prediction and inter prediction (see, e.g., Non-patent Document 1).

Information handled in moving image coding includes a combination of information (moving image information) on pixels constituting the image, information (header information) describing how to handle the moving image information, and motion vector information used for inter prediction.

Due to recent technological progress, the compression efficiency of the moving image information has been improved remarkably, but the improvement of the compression ratio of the header information and the motion vector information is not so high.

As the related art relating to an image transmission apparatus, there are the specifications of International Publication No. WO 2010/137323 "VIDEO ENCODER, VIDEO DECODER, VIDEO ENCODING METHOD, AND VIDEO DECODING METHOD" (Mitsubishi Electric Corporation, Patent Document 1), Japanese Patent No. 4245576 "IMAGE COMPRESSION/DECOMPRESSION METHOD, IMAGE COMPRESSION APPARATUS AND IMAGE DECOMPRESSION APPARATUS" (TOA Corporation, Patent Document 2), and Joint Video Team (JVT) of ISO/IEC MPEG & ITU-T VCEG: Text of ISO/IEC 14496-10 Advanced Video Coding 3rd Edition (2004) (Non-patent Document 1).

Patent Document 1 discloses that a compressing unit of a video encoding device selects whether to transform and quantize a prediction error signal after reduction and transformation to create quantization coefficient data, and in the case of reduction, after inverse-quantizing and inversetransforming the quantization coefficient data, an enlargement transformation is performed to create a decoded prediction error signal.

Patent Document 2 discloses an image compression and decompression method which includes converting other regions than a region designated as a significant region into reduced data, re-arranging a significant region and reduced data in an image region matched with the horizontal width of the significant region to generate reduced image data, performing motion-compensated prediction and encoding processing, restoring the original arrangement based on the header information after decompression processing at the time of restoration, and performing compensation processing on the reduced data to restore the image data.

PRIOR ART DOCUMENTS

Patent Documents

Patent Document 1: Specification of International Publication No. WO 2010/137323
Patent Document 2: Japanese Patent No. 4245576

Non-Patent Documents

Non-patent Document 1: Joint Video Team (JVT) of ISO/IEC MPEG & ITU-T VCEG: Text of ISO/IEC 14496-10 Advanced Video Coding 3rd Edition (2004)

As described above, in the conventional image processing device, encoding and decoding are performed while performing flexible adjustment according to the transmission bandwidth. Accordingly, when attempting to transmit a high-definition image using a narrow transmission bandwidth, fine adjustment of the compression process cannot be performed in the video encoder, which causes a deterioration in image quality of an output image to make restoration difficult.

Further, Patent Documents 1 and 2 do not disclose a compression side configuration of calculating the complexity of an input image as a transmission-side complexity, performing encoding while adjusting the cutoff frequency of a low pass filter and the scaling factor of a reduction unit, and transmitting the encoded stream and the transmission-side complexity, and a decompression side configuration of comparing the complexity of the decoded image with the complexity of the received transmission image and optimizing and setting the scaling factor of an image enlargement unit and the folding frequency of a super-resolution processing unit so as to minimize a difference therebetween.

SUMMARY OF THE INVENTION

In view of the above, the present invention provides an image processing device capable of obtaining a high-quality image even in a situation where fine adjustment cannot be performed in a conventional video encoder.

According to an aspect of the present invention, there is provided an image processing device including an image compression unit for compressing an input image, and an image decompression unit for decompressing and outputting the compressed image. The image compression unit includes a low pass filter configured to limit a bandwidth of an input image signal based on a preset cutoff frequency; an image reduction unit configured to reduce an output signal from the low pass filter according to a preset reduction factor; an encoding unit configured to encode an output signal from the image reduction unit; a first complexity calculation unit configured to calculate at least one first parameter indicating image complexity for the input image signal; a control unit configured to set an optimal reduction factor in the image reduction unit while setting an optimal cutoff frequency in the low pass filter, based on the first parameter; and a multiplexer configured to multiplex the first parameter and an encoded stream outputted from the encoding unit for output, and wherein the image decompression unit includes: a demultiplexer configured to extract the encoded stream and the first parameter from an input signal; a decoding unit configured to decode the encoded stream; an image enlargement unit configured to enlarge an output signal from the decoding unit according to a specified enlargement factor; a super-resolution processing unit configured to perform a super-resolution process on the enlarged image using a specified folding frequency; a second complexity calculation unit configured to calculate at least one second parameter indicating image complexity for the enlarged image; a complexity comparison unit configured to calculate a difference or a ratio between the first parameter and the second parameter; and a parameter calculation unit configured to set an optimal folding frequency in the super-resolution processing unit while setting an optimal enlargement factor in the image enlargement unit, based on the difference or the ratio.

According to another aspect of the present invention, there is provided an image processing device including an image compression unit for compressing an input image, and an image decompression unit for decompressing and outputting the compressed image. The image compression unit includes a low pass filter configured to limit a bandwidth of an input image signal based on a preset cutoff frequency, an image reduction unit configured to reduce an output signal from the low pass filter according to a preset reduction factor, an encoding unit configured to encode an output signal from the image reduction unit, a demultiplexer configured to extract a quantization parameter indicating a degree of information loss from a signal outputted from the encoding unit, a first complexity table processing unit, which has a table storing a feedback value corresponding to a combination of at least one parameter indicating a complexity and the quantization parameter, configured to calculate at least one first parameter indicating image complexity for the input image signal, and to output a feedback value corresponding to the extracted quantization parameter and the first parameter based on the table; and a control unit configured to set an optimal reduction factor in the image reduction unit while setting an optimal cutoff frequency in the low pass filter, based on the feedback value. The image decompression unit includes a demultiplexer configured to extract an encoded stream and the quantization parameter from an input signal, a decoding unit configured to decode the encoded stream, an image enlargement unit configured to enlarge an output signal from the decoding unit according to a preset enlargement factor, a super-resolution processing unit configured to perform a super-resolution process using a specified folding frequency, a second complexity table processing unit, which has a table storing an enlargement factor corresponding to a combination of at least one parameter indicating a complexity and the quantization parameter, configured to calculate at least one second parameter indicating image complexity for the image enlarged by the image enlargement unit, and to output an enlargement factor corresponding to the extracted quantization parameter and the second parameter based on the table; and a parameter calculation unit configured to set an optimal folding frequency in the super-resolution processing unit based on the enlargement factor while setting the enlargement factor in the image enlargement unit.

In the image processing device according to another aspect of the present invention, in the image compression unit, the image reduction unit performs reduction of an entire frame when the first parameter is smaller than a preset first threshold value, and does not perform reduction of the entire frame when the first parameter is equal to or greater than the preset first threshold value, and the encoding unit calculates a parameter indicating a complexity for each of divided regions of the input image regardless of performing the reduction of the entire frame, performs encoding with reducing a region for which the parameter is smaller than a preset second threshold value, and performs encoding without reducing a region for which the parameter is equal to or greater than the preset second threshold value, and wherein in the image decompression unit, the decoding unit performs decoding each of regions according to whether reduction of said each region and reduction of the entire frame has been performed or not in the image compression unit.

According to the present invention, even if fine setting corresponding to the transmission bandwidth cannot be performed, the image compression unit and the image decompression unit can perform optimal reduction/enlargement processing and super-resolution processing in cooperation depending on the complexity of the image, and a high-quality output image can be reproduced even when transmitted at a low bandwidth.

Further, according to the present invention, even if fine setting corresponding to the transmission bandwidth cannot be performed, without transmitting parameters from the image compression unit, optimal reduction/enlargement processing and super-resolution processing can be performed depending on the complexity of the image, and a high-quality output image can be reproduced even when transmitted at a low bandwidth.

Further, according to the present invention, by performing a combination of the reduction of all frames and the reduction of the motion vector depending on the complexity of the image, it is possible to reduce the amount of header information and improve the compression ratio of the moving image.

BRIEF DESCRIPTION OF THE DRAWINGS

FIG. 2 is a block diagram of an image processing device according to a second embodiment of the present invention.

FIG. 5 is a block diagram of an encoding processor of a third image processing device.

FIG. 6 is a block diagram of a decoding processor of the third image processing device.

FIG. 19 is an explanatory diagram showing examples of the image size to be processed by the third image processing device.

DETAILED DESCRIPTION OF THE EMBODIMENTS

An image processing device and an image processing method according to embodiments of the present invention may be summarized as follows. A transmission-side device calculates the complexity of an image for an input image, transmits the calculation result (transmission image complexity), which is multiplexed into a compressed image stream, to a reception-side device, and appropriately sets the pass band of a low pass filter and the scaling parameter in an image compression process according to the transmission image complexity. Further, the reception-side device compares the received transmission image complexity with the complexity (decoded image complexity) calculated for the decoded image, and optimizes the scaling parameter of an image decompression process and the parameter of the folding frequency of a super-resolution process on the basis of the comparison result. Accordingly, the transmission-side and reception-side devices perform linked operations to perform appropriate scaling processing and super-resolution processing according to the complexity of the image, thereby obtaining a high-quality output image.

Further, in the image processing device according to the embodiments of the present invention, the transmission-side device calculates the complexity of the image, extracts a quantization parameter of an encoding process from the compressed image stream, and appropriately sets the pass band of the low pass filter and the scaling parameter in the image compression process according to the complexity and the quantization parameter. The reception-side device extracts a quantization parameter from the received signal, and optimizes the scaling parameter of the image decompression process and the parameter of the super-resolution process according to the quantization parameter. Thus, the transmission-side and reception-side devices perform linked operations to perform appropriate scaling processing and super-resolution processing according to the complexity of the image, thereby obtaining a high-quality output image.

First Embodiment

Figure 1:
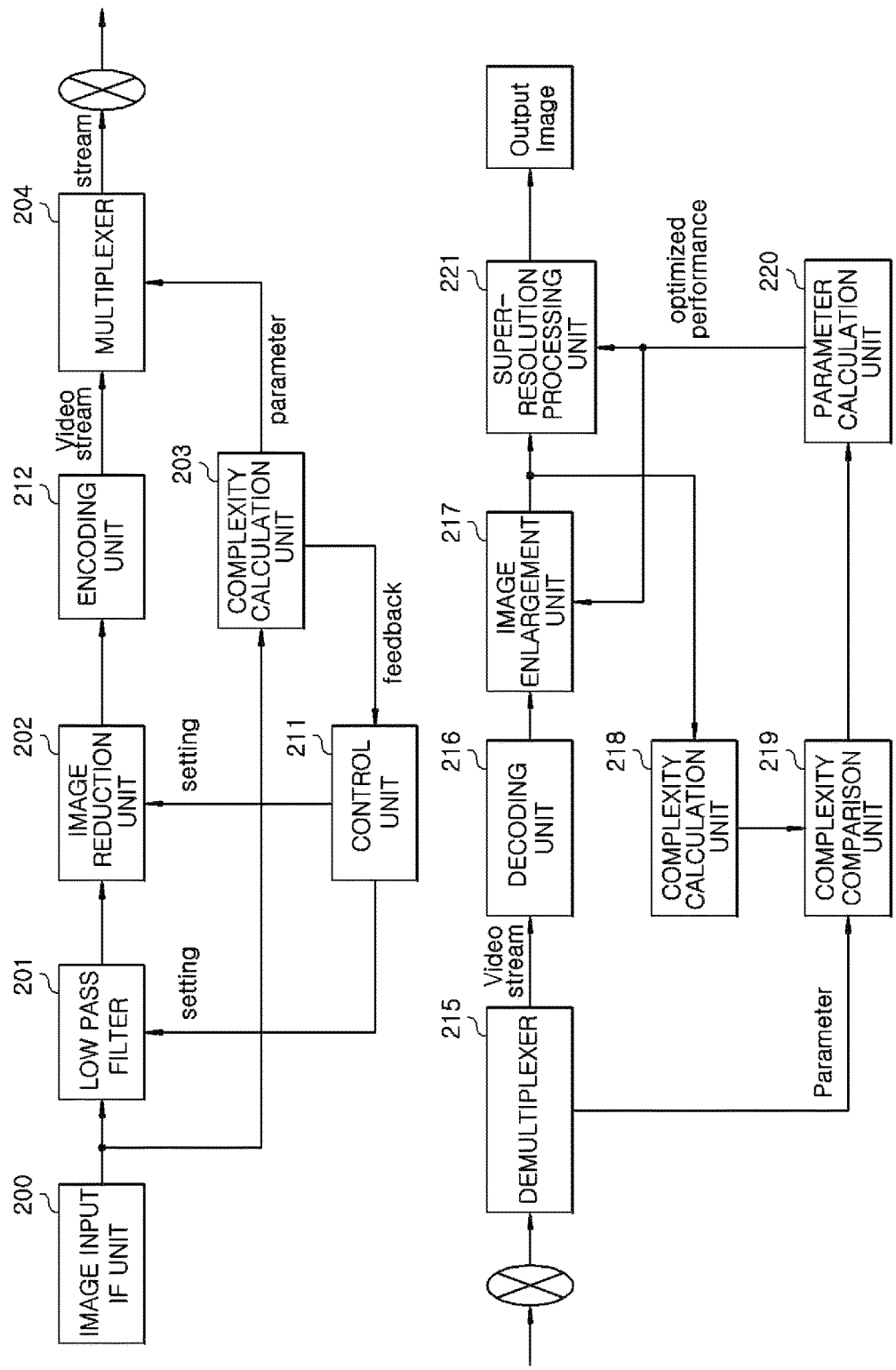
FIG. 1 is a block diagram of an image processing device according to a first embodiment of the present invention.

FIG. 1 is a block diagram of an image processing device according to a first embodiment of the present invention.

Figure 20:
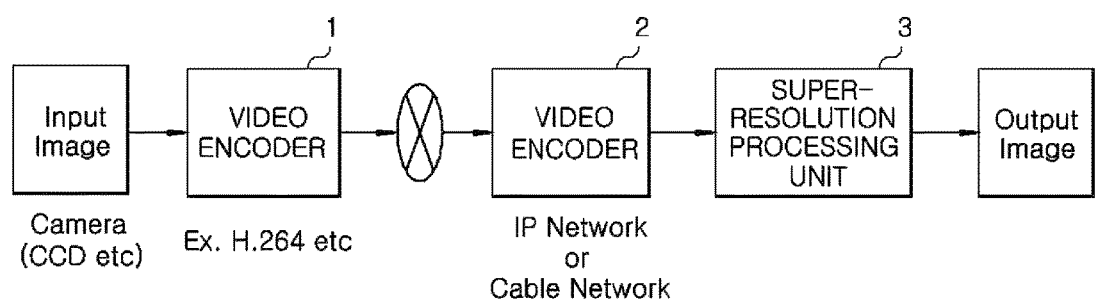
FIG. 20 is a schematic block diagram of an image transmission system having a general image processing device.

An image processing device (first image processing device) according to the first embodiment has a configuration similar to the image processing system shown in FIG. 20, which includes the video encoder 1, the video decoder 2, and the super-resolution processing unit 3. That is, the upper side of FIG. 1 corresponds to the video encoder 1 of FIG. 20, and the lower side of FIG. 1 corresponds to the video decoder 2 and the super-resolution processing unit 3 of FIG. 20. The video decoder is configured to include the super-resolution processing unit. Further, the video encoder is equivalent to an image compression unit as described in the claims, and the video decoder is equivalent to an image decompression unit.

The video encoder includes an image input IF unit 200, a low pass filter 201, an image reduction unit 202, an encoding unit 212, a complexity calculation unit 203, a multiplexer 204, and a control unit 211.

The video decoder includes a demultiplexer 215, a decoding unit 216, an image enlargement unit 217, a complexity calculation unit 218, a complexity comparison unit 219, a parameter calculation unit 220, and a super-resolution processing unit 221.

(Configuration of the Video Encoder)

First, each part of the video encoder will be described in detail.

The image input IF unit 200 is an interface for acquiring image data from an imaging device such as a CCD camera or a sensor. The input format of the image data is a HD-SDI (High Definition Serial Digital Interface) format or the like.

The low pass filter 201 limits a bandwidth by cutting components above a specific frequency (cutoff frequency) from an input image signal received from the image input IF unit 200. The cutoff frequency is set by the instructions from the control unit 211. Further, the low pass filter 201 does not have a function of changing an image size of the image data.

The image reduction unit 202 reduces the image size of the input image data. The image size is reduced according to the scaling factor set by the control unit 211. The scaling factor set in the image reduction unit 202 is equivalent to a reduction factor as described in the claims.

The encoding unit 212 encodes the input image data for each N×M pixel block in a coding scheme of H.264 or H.265 (N, M is an integer of 2 or more). It is assumed that the encoding unit 212 is a general encoder which can set only the image size and the transmission bit rate and cannot perform internal fine adjustment. The encoding unit 212 in which the transmission bit rate is set as a target rate generates and outputs an encoded stream at the rate by internally controlling a quantization parameter or the like. Further, in the case of transmitting images of a monitoring camera, it is rare to apply a perfect constant bitrate (CBR). The moving picture coding scheme is not limited to H.264 and the like, and may be a technique for reducing the amount of data to a transmission bandwidth for transmitting the image data.

The complexity calculation unit 203 calculates the complexity for the input image, and outputs a parameter (transmission image complexity) indicating the complexity. In this embodiment, an activity indicating the sum of magnitudes of differences between an average of pixel values in a block and respective pixel values is used as a calculation example of the complexity.

A method of calculating the activity will be described in brief.

The complexity calculation unit 203 divides the input image into basic blocks of M×N pixels, and calculates a pixel average for each basic block by Eq. 1.

$$\text{average} = \frac{1}{M \times N} \sum_{i=0}^{M \times N} pix(i) \qquad \text{(Eq. 1)}$$

Then, an absolute value of a difference (absolute difference) between the calculated average and each pixel value in the basic block is obtained and the sum of the absolute values (the sum of absolute differences) is calculated as the activity (Eq. 2).

$$\text{activity} = \sum_{i=0}^{M \times N} |\text{average} - pix(i)| \qquad \text{(Eq. 2)}$$

The activity becomes a large value when the image of the basic blocks is complicated, and becomes a small value when the image of the basic blocks is simple.

The complexity calculation unit 203 parameterizes the calculated activity and outputs a complexity (transmission image complexity) that is a parameter indicating the complexity to the control unit 211 and the multiplexer 204. The transmission image complexity is equivalent to a first parameter as described in the claims. The output unit of the transmission image complexity may be any one of basic block, slice which is a set of basic blocks, and frame. As a parameterization process, there are, for example, a method of dividing the range of activity into 256 stages (areas) as 1 byte data (0-255), or a method of determining which area the calculated activity belongs to with reference to a codebook or the like and encoding into a shorter bit string.

The multiplexer 204 multiplexes the complexity inputted from the complexity calculation unit 203 into the encoded stream, and outputs it as a transmission stream to a transmission path. In the case of H.264 stream, since a Super Enhancement Information (SEI) area where information can be multiplexed freely by the user is ensured, the multiplexer 204 multiplexes and outputs the transmission image complexity to the SEI area of the encoded stream. If a plurality of transmission image complexities are collectively multiplexed into the SEI, arithmetic coding of a range coder or run-length coding may be applied.

The control unit 211 stores in advance the scaling factor and the cutoff frequency corresponding to the transmission image complexity. Then, based on the input transmission image complexity and transmission bit rate, the scaling factor of the image reduction unit 202 and the cutoff frequency of the low pass filter 201 are determined and set respectively. This control is specific when the transmission bit rate set in the encoding unit 212 is lower than a predetermined value and/or when the input image is complicated.

For example, the control unit 211 determines that the complexity represents an abundance of high-frequency components when the complexity of the input image is within a normal range. Accordingly, the control unit 211 reduces (i.e., downscales) the scaling factor as the complexity is smaller, and decreases the cutoff frequency in proportion to the scaling factor. Further, components above the cutoff frequency remain in the encoded image to be weakened, and residual aliasing (aliasing distortion) may be used usefully for super-resolution processing.

On the other hand, when the transmission image complexity exceeds a predetermined value, the high frequency components are greatly cut by setting the cutoff frequency of the low pass filter 201 to a lower value, and at the same time, the reduction is performed such that the aliasing is almost completely eliminated by setting the scaling factor for the image reduction unit 202 to a slightly larger value. Alternatively, the reduction may not be carried out (scaling factor is set to 1) in order to eliminate the need for super-resolution processing. The cutoff frequency and the scaling factor at this time are respectively called a specific cutoff frequency and a specific scaling factor. Thus, the scaling factor and the cutoff frequency may vary discontinuously across a predetermined value.

That is, in the first image processing device, by appropriately setting the scaling factor of image reduction and the cutoff frequency according to the complexity of the input image at the video encoder side, a high-resolution image can be outputted at the reception side even when the image is transmitted at a low bandwidth.

(Configuration of the Video Decoder)

Next, a description will be given of each part of the video decoder side.

The demultiplexer 215 receives the multiplexed transport stream from the transmission path and divides the transport stream into the encoded stream and the transmission image complexity. Then, the demultiplexer 215 outputs the encoded stream to the decoding unit 216 and outputs the transmission image complexity to the complexity comparison unit 219.

The decoding unit 216 decodes the input encoded stream in a decoding scheme corresponding to the coding scheme at the encoder side. In this embodiment, a general H.264 decoder is assumed.

The image enlargement unit 217 enlarges the decoded image data according to the scaling factor specified by the parameter calculation unit 220. The scaling factor set in the image enlargement unit 217 or a reciprocal thereof is equivalent to an enlargement factor as described in the claims.

The complexity calculation unit 218 calculates the complexity for each reference block with respect to the image data that has been enlarged to its original size, and outputs the decoded image complexity as a parameter indicating the complexity of the decoded image. The decoded image complexity is equivalent to a second parameter as described in the claims. The complexity calculation process and the parameterization process are the same as those in the complexity calculation unit 218 at the video encoder side.

The complexity comparison unit 219 compares the transmission image complexity outputted from the demultiplexer 215 with the decoded image complexity calculated by the complexity calculation unit 218 at the video decoder side, and calculates a difference or ratio thereof. That is, the complexity comparison unit 219 detects how the complexity of the input image has been changed (degraded) by the processing and transmission of the low pass filter 201, the image reduction unit 202 and the encoding unit 212 in the video encoder on the transmission side.

The parameter calculation unit 220 receives a difference or ratio (difference in this embodiment) between the transmission image complexity and the decoded image complexity outputted from the complexity comparison unit 219. Then, the parameter calculation unit 220 determines an optimal scaling factor in the image enlargement unit 217 and an optimal folding frequency in the super-resolution processing unit 221 based on the difference, for example, such that the difference is smallest, and outputs them to the image enlargement unit 217 and the super-resolution processing unit 221, respectively. In the case of using the ratio, it is controlled such that the ratio approaches 1.

That is, the parameter calculation unit 220 controls the image enlargement unit 217 and the super-resolution processing unit 221 such that the complexity of the input image which has been degraded by the processing of the transmission side can be reproduced as much as possible.

By way of example, the parameter calculation unit 220 stores a threshold value for determining whether the reduction has been carried out at the transmission side based on the complexity difference. First, an initial value "1" of the scaling factor is assigned to the image enlargement unit 217. If the complexity difference is equal to or less than the threshold value, it is determined that the scaling factor is appropriate or not reduced. Then, the scaling factor of 1 is outputted to the image enlargement unit 217, and the folding frequency corresponding thereto is outputted to the super-resolution processing unit 221.

If the complexity difference is greater than the threshold value, the scaling factor is set to be greater than 1 as the complexity difference increases from the threshold value, and at the same time, the folding frequency decreases in inverse proportion thereto. This process may be repeated until the difference is converged to the threshold value.

Further, if the complexity difference (or the complexity itself) exceeds a predetermined value, or the difference does not converge in a predetermined number of times of repetition, the folding frequency and the scaling factor are set to correspond to the specific cutoff frequency and the specific scaling factor described above, respectively.

The parameter calculation unit 220 may store the scaling factor corresponding to the complexity difference as a table, and may calculate the scaling factor by using an equation.

The scaling factor needs to be equal to the scaling parameter applied in the image reduction unit 202 of the video encoder side. The folding frequency may be determined uniquely to correspond to the scaling factor, and does not provide a critical impact even if an error occurs.

Thus, while the image enlargement unit 217 enlarges the image to the same image size as the original image of the transmission side, the super-resolution processing unit 221 appropriately removes the aliasing components by super-resolution processing to restore high-frequency components, thereby reproducing a high-resolution image.

The image enlargement unit 217 enlarges the input image according to the scaling factor set by the parameter calculation unit 220.

The super-resolution processing unit 221 removes the aliasing components based on the folding frequency set by the parameter calculation unit 220 and performs a super-resolution process to output a high-resolution reproduced image. The super-resolution processing unit 221 basically restores the components above the folding frequency from the components below the folding frequency.

In a case where the super-resolution method is different, the parameter calculation unit 220 may basically set the same frequency as the cutoff frequency of the low pass filter 201 as a parameter in the super-resolution processing unit 221. In this case, the cutoff frequency of the low pass filter 201 or the scaling factor capable of uniquely specifying the cutoff frequency should be transmitted along with or in place of the complexity from the encoder side.

(Operation of the First Image Processing Device)

Next, an operation of the first image processing device will be described with reference to FIG. 1.

As shown in FIG. 1, at the video encoder side, the image data inputted from the image input IF unit 200 is divided into two parts. One part of the image data is processed by the low pass filter 201 such that high-frequency components are cut off according to the cutoff frequency corresponding to the complexity of the image, and is reduced by the image reduction unit 202 according to the scaling factor corresponding to the complexity of the image.

The reduced image is encoded by the encoding unit 212 and inputted to the multiplexer 204 as an encoded stream.

The other part of the image data is processed by the complexity calculation unit 203 to calculate a transmission image complexity that is a parameter depending on the complexity of the image. The transmission image complexity is inputted to the control unit 211 and the multiplexer 204.

Then, the control unit 211 sets optimal values of the cutoff frequency of the low pass filter 201 and the scaling factor of the image reduction unit 202, respectively, based on the transmission image complexity. In this case, the cutoff frequency and the scaling factor are appropriately adjusted to suppress a deterioration in image quality even when the image is transmitted at a low bandwidth.

Further, the multiplexer 204 multiplexes and outputs the transmission image complexity and the encoded stream to the transmission path.

Meanwhile, at the video decoder on the reception side, the data received from the transmission path is separated into the encoded stream and the transmission image complexity by the demultiplexer 215. The encoded stream is decoded by the decoding unit 216, and enlarged at the optimal scaling factor by the image enlargement unit 217.

Then, the complexity calculation unit 218 calculates the complexity of the image from the enlarged image, and outputs the decoded image complexity as a parameter.

The complexity comparison unit 219 compares the transmission image complexity separated from the received signal with the decoded image complexity calculated at the decoding side, and outputs a difference therebetween.

Then, the parameter calculation unit 220 calculates the scaling factor of the image enlargement unit 217 according to the complexity difference, specifies the folding frequency of the super-resolution processing unit 221 based thereon, and sets the scaling factor and the folding frequency in the image enlargement unit 217 and the super-resolution processing unit 221, respectively. In this embodiment, the optimal parameters are set in the image enlargement unit 217 and the super-resolution processing unit 221 so that the complexity of the original image degraded by the processing of the transmission side can be reproduced as much as possible.

The super-resolution processing unit 221 performs a super-resolution process based on the folding frequency from the parameter calculation unit 220, and outputs a high-definition image.

As described above, the operation of the first image processing device is performed. When the transmission image complexity is multiplexed (i.e., scaling factor is changed) for each frame (picture) or slice in H.264, the present embodiment may be implemented easily. If multiplexing is performed for each basic block, when limited to the scaling factor for color difference components (i.e., as a change in color format), or when limited to the picture that does not perform motion compensation, the present embodiment can be applied.

According to the image processing device and the image processing method in accordance with the first embodiment of the present invention, in the video encoder, the complexity calculation unit 203 calculates the transmission image complexity as a parameter of the complexity of the input image, and the multiplexer 204 multiplexes the transmission image complexity into the reduced encoded stream and outputs it to the transmission path. Also, the cutoff frequency of the low pass filter 201 and the scaling factor of the image reduction unit 202 are set appropriately according to the transmission image complexity. In the video decoder, the demultiplexer 215 extracts the transmission image complexity from the encoded stream, the decoding unit 216 decodes the encoded stream, and the image enlargement unit 217 performs enlargement at the appropriate scaling factor. The complexity calculation unit 218 calculates the decoded image complexity which is a parameter of the complexity for the enlarged image, and the complexity comparison unit 219 compares the transmission image complexity with the decoded image complexity and outputs a difference or ratio thereof. The parameter calculation unit 220 optimally sets the scaling factor of the image enlargement unit 217 and the folding frequency of the super-resolution processing unit 221 based on the complexity difference or ratio. The image enlargement unit 217 enlarges the image at the set scaling factor, and the super-resolution processing unit 221 performs a super-resolution process by removing the aliasing components based on the set folding frequency. The image processing device on the transmission side and the image processing device on the reception side perform linked operations, thereby performing an appropriate scaling process and super-resolution process according to the complexity of the image. Therefore, it is possible to reproduce a high-quality output image even when the image is transmitted at a low bandwidth.

Second Embodiment

An image processing device (second image processing device) according to a second embodiment of the present invention can achieve high image quality on the reception side even though the parameter information indicating the complexity is not transmitted from the image processing device on the transmission side.

(Configuration of the Second Image Processing Device)

FIG. 2 is a block diagram of an image processing device according to a second embodiment of the present invention. As shown in FIG. 2, the video encoder of the second image processing device includes, as the same parts as those of the first image processing device, an image input IF unit 300, a low pass filter 301, an image reduction unit 302, and an encoding unit 312. The video encoder of the second embodiment further includes, as characteristic parts of the second image processing device, a complexity table processing unit 303, a demultiplexer 304, and a control unit 311.

Further, the video decoder of the second image processing device includes, as the same parts as those of the first image processing device, a decoding unit 316, an image enlargement unit 317, a parameter calculation unit 320, and a super-resolution processing unit 321. The video decoder of the second embodiment further includes, as characteristic parts of the second image processing device, a demultiplexer 315 and a complexity table processing unit 319. For the same parts as those of the first image processing device, a description thereof will be omitted.

Hereinafter, the characteristic parts of the second image processing device will be described in detail.

(Configuration of the Video Encoder)

The demultiplexer 304 of the video encoder receives the encoded stream outputted from the encoding unit 312, and extracts a quantization parameter from the encoded stream.

The quantization parameter is a parameter used in the coding scheme such as H.264, and indicates how much information is lost by encoding.

If the quantization parameter is large, the width of a quantization step is large, and the information amount of the image data is greatly reduced, thereby causing a large deterioration in image quality. On the contrary, if the quantization parameter is small, a deterioration in image quality is small.

The complexity table processing unit 303 calculates the complexity that is a parameter indicating the complexity of the input image. As a method of calculating the complexity, for example, the complexity is calculated based on the activity described in conjunction with the first image processing device. Further, as a feature of the second image processing device, the complexity table processing unit 303 includes a table for outputting a feedback value using the quantization parameter and the complexity as arguments, and outputs the feedback value to the control unit 311 based on the calculated complexity and the quantization parameter inputted from the demultiplexer 304.

The feedback value may correspond to the scaling factor of the image reduction unit 302. For example, the feedback value may be the scaling factor itself.

An example of setting the scaling factor with reference to the table of the complexity table processing unit 303 will be described in brief.

The quantization parameter indicates how much information is lost in the video encoder. The information loss may be caused by two cases where each image is dense and where the motion is severe.

When each image is dense, an effect of the super-resolution processing at the video decoder side is larger when information is reduced based on so-called downscaling (reduction) rules rather than when information is lost at the video encoder side.

On the other hand, in images in which the motion is severe, an effect of the super-resolution processing is not necessarily improved even though the image is greatly reduced by reducing the scaling factor.

Thus, in the table of the complexity table processing unit 303, even with the same quantization parameter, the scaling factor is reduced as the complexity is larger, i.e., each image is denser, to greatly contribute to the image reduction.

Also, in rare cases of simple images in which the complexity is small and the quantization parameter is large, since a problem does not occur in image reproduction even though the scaling factor is reduced, the scaling factor is set to a small value in the table.

Thus, it is possible to reliably reduce an overhead such as a header as much as the image is reduced. Also, since it is possible to expand a motion search range, there is a possibility of improving the motion compensation accuracy.

The control unit 311 stores the scaling factor and the cutoff frequency corresponding to the feedback value, sets the appropriate cutoff frequency based on the input feedback value in the low pass filter 301, and sets the scaling factor in the image reduction unit 302. The feedback value may be directly used as the scaling factor.

The cutoff frequency is proportional to the scaling factor. For example, if the scaling factor is 1 (no reduction), the low pass filter 301 is set to an all-pass mode (cutoff frequency is set to a high value). If the scaling factor is 0.5, the cutoff frequency is set to a frequency which is half the frequency in the all-pass mode to pass the low-frequency side half in the all-pass mode.

Alternatively, the cutoff frequency may be set to a frequency slightly higher than the half frequency to produce folding which can be restored by a super-resolution process.

For example, when the transmission bandwidth is low, the input image is complex, and the quantization parameter is large, so as not to increase a deterioration in image quality, the cutoff frequency of the low pass filter 301 is reduced to greatly cut the high-frequency components. At the same time, in the image reduction unit 302, the scaling factor is set to a larger value to suppress a deterioration in image quality due to a compression process. In other words, it is controlled such that the quantization parameter decreases.

Thus, at the video encoder side of the second image processing device, the appropriate scaling factor and cutoff frequency are set according to the complexity of the input image and a loss state of the information amount in encoding. Accordingly, a high-resolution image can be restored on the reception side even when the image is transmitted at a low bandwidth.

The demultiplexer 304 may obtain the quantization parameter for each basic block, slice, or frame. The control unit 311 may set the scaling factor or the like for each basic block, slice, or frame. However, since the obtained quantization parameter has a delay, the scaling factor and the cutoff frequency should be applied to an image having a quantization parameter in sufficient correlation with the obtained quantization parameter. If a feedback is performed on a frame-by-frame basis, the complexity table processing unit 303 may obtain one quantization parameter which is representative of a plurality of quantization parameters of the nearest frame, and use the quantization parameter as an argument of the table. In the case of using an encoding unit that does not control the quantization parameters dynamically in a frame, the quantization parameters obtained within one frame in the encoding order may be used as they are.

(Configuration of the Video Decoder)

The demultiplexer 315 of the video decoder side extracts a quantization parameter from the encoded stream received from the transmission path.

The complexity table processing unit 319 calculates a complexity indicating the complexity for the decoded image enlarged by the image enlargement unit 317. The complexity is calculated by the same method as the complexity table processing unit 303 of the video encoder side.

Further, the complexity table processing unit 319 includes a table storing a control value corresponding to the quantization parameter and the complexity, and outputs the control value corresponding to the quantization parameter inputted from the demultiplexer 315 and the calculated complexity to the parameter calculation unit 320.

The control value may correspond to the scaling factor of the image enlargement unit 317. For example, the control value may be the scaling factor itself.

The parameter calculation unit 320, similarly to the parameter calculation unit 220 of the first embodiment, may set the optimal scaling factor in the image enlargement unit 317 and set the optimal folding frequency in the super-resolution processing unit 321 according to the input control value. The input control value is preferably based on the quantization parameter strictly corresponding to the image itself to which the set scaling factor or the like is applied. That is, the complexity table processing unit 319 does not need to hold the quantization parameter of the previous frame in accordance with the processing of the encoder side, and may assign a control value based on the current quantization parameter to the parameter calculation unit 320.

(Operation of the Second Image Processing Device)

Next, an operation of the second image processing device will be described with reference to FIG. 2. For the same processing of the first image processing device, a description thereof will be omitted.

As shown in FIG. 2, at the video encoder side, similarly to the first image processing device, the input image is processed by the low pass filter 301 to limit the bandwidth, is reduced by the image reduction unit 302, is encoded by the encoding unit 312, and is outputted as an encoded stream to the transmission path.

A part of the encoded stream is inputted to the demultiplexer 304. Then, the quantization parameter is extracted and inputted to the complexity table processing unit 303.

The complexity table processing unit 303 calculates the complexity based on the input image. With reference to the table based on the complexity and the quantization parameter, the scaling factor of the image reduction unit 302 is determined as a corresponding feedback value, and is inputted to the control unit 311.

The control unit 311 sets the scaling factor in the image reduction unit 302, and sets the cutoff frequency corresponding to the scaling factor in the low pass filter 301.

In the second image processing device, at the encoder side, by appropriately setting the scaling factor and the cutoff frequency, it is possible to transmit the image at a low bandwidth, and also possible to suppress a deterioration in image quality.

At the video decoder, the received data is decoded, is enlarged, and is inputted to the super-resolution processing unit 321 and the complexity table processing unit 319.

Further, the quantization parameter extracted from the received data is inputted to the complexity table processing unit 319.

The complexity table processing unit 319 calculates the complexity of the enlarged decoded image. With reference to the table based on the complexity and the quantization parameter, the scaling factor of the image enlargement unit 317 is determined as a control value, and the scaling factor is outputted to the parameter calculation unit 320.

The parameter calculation unit 320 sets the input scaling factor in the image enlargement unit 317, and sets the folding frequency corresponding to the scaling factor in the super-resolution processing unit 321.

The super-resolution processing unit 321 performs a super-resolution process based on the input folding frequency, and outputs a high-definition image.

According to the image processing device and the image processing method in accordance with the second embodiment of the present invention, in the video encoder, the demultiplexer 304 extracts the quantization parameter from the encoded stream, and the complexity table processing unit 303 calculates the complexity of the input image. Based on the complexity and the quantization parameter, the scaling factor of the image reduction unit 302 is determined and outputted to the control unit 311. The control unit 311 sets the input scaling factor in the image reduction unit 302, and sets the cutoff frequency corresponding to the scaling factor in the low pass filter 301. In the video decoder, the demultiplexer 315 extracts the quantization parameter from the input encoded stream, and the complexity table processing unit 319 calculates the complexity of the decoded enlarged image. Based on the complexity and the quantization parameter, the scaling factor of the image enlargement unit 317 is determined and outputted to the parameter calculation unit 320. The parameter calculation unit 320 sets the input scaling factor in the image enlargement unit 317, and sets the folding frequency corresponding to the scaling factor in the super-resolution processing unit 321. The image processing device on the transmission side and the image processing device on the reception side perform linked operations, thereby performing an appropriate scaling process and super-resolution process according to the complexity of the image. Therefore, it is possible to reproduce a high-quality output image even when the image is transmitted at a low bandwidth.

Third Embodiment

Next, an image processing image (third image processing device) according to a third embodiment of the present invention will be described.

The third image processing device may be implemented alone or in combination with the first or second image processing device in consideration of the coding scheme of performing motion compensation. The third image processing device has in common with the above embodiment in that, at the encoder side, the image is reduced and the total number of macroblocks in a frame is decreased to reduce the header information of the macroblocks.

Figure 3A:
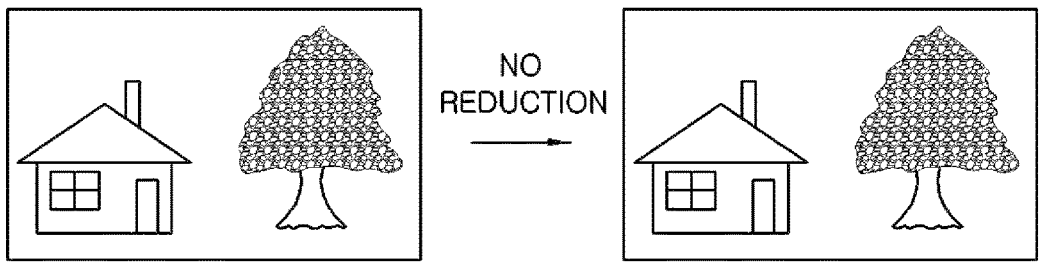
FIGS. 3A and 3B are schematic explanatory diagrams showing a reduction process of the frame according to the complexity of the image.
Figure 3B:
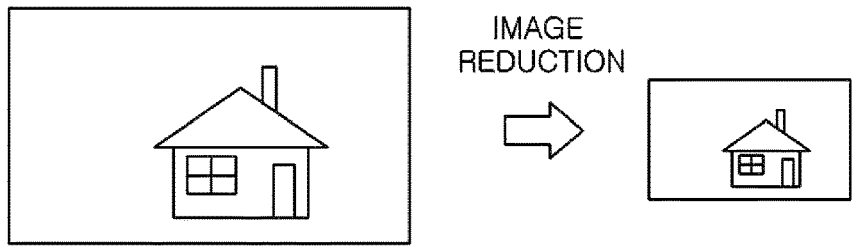
Figure 4A:
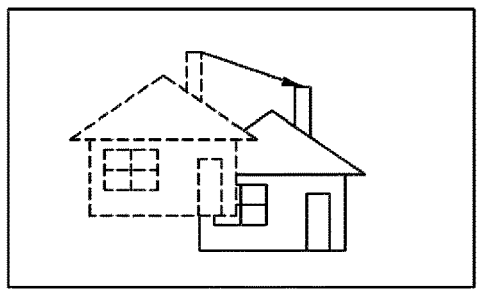
FIGS. 4A and 4B are schematic explanatory diagrams showing a motion vector accompanied by the image reduction.
Figure 4B:

First of all, an overview of the improvement of the compression ratio in the third image processing device will be described with reference to FIGS. 3A to 4B. FIGS. 3A and 3B are schematic explanatory diagrams showing reduction processes of the frame according to the complexity of the image. FIGS. 4A and 4B are schematic explanatory diagrams showing motion vectors accompanied by the image reduction.

In an image shown in FIG. 3A, leaves on the right side exhibit a high complexity. However, when the camera is turned around to the left to make the leaves out of sight as shown in FIG. 3B, the complexity of the corresponding frame is reduced.

As shown in FIG. 3A, when the image size of a complex image is reduced, a detailed pattern of a complex part is lost, which causes a deterioration in image quality. On the other hand, as shown in FIG. 3B, when there is no complex part in the image, a small deterioration occurs in image quality even if the image size is reduced.

Further, as shown in FIGS. 4A and 4B, when the image is reduced, the magnitude of the motion vector also decreases.

The motion vector uses a difference from the predicted vector using the surrounding motion vectors, but the difference vector also can be reduced by reducing the image. Thus, it is possible to reduce the code amount of motion vectors.

Therefore, in the third image processing device, the image is reduced according to the complexity of the image to achieve a reduction of the header information and the motion vector information. As a specific method, a combination of the reduction of all frames and the reduction of the motion vector is appropriately selected according to the complexity of the image, thereby improving the compression ratio without degrading the quality of the reproduced image.

(Configuration of the Third Image Processing Device)

The configuration of the third image processing device will be described with reference to FIGS. 5 and 6. FIG. 5 is a block diagram of an encoding processor of the third image processing device. FIG. 6 is a block diagram of a decoding processor of the third image processing device.

The third image processing device has been considered in the encoding and decoding process, and has a kind of two-pass encoding configuration in which both the original image and the reduced image are first encoded (quantization of transform coefficients).

(Configuration of the Encoding Processor)

First, the configuration of the encoding processor of the third image processing device will be described with reference to FIG. 5.

As shown in FIG. 5, the encoding processor of the third image processing device includes a complex image region search unit 11, an image reducing unit 12, a reduced image region dividing unit 13, an image region dividing unit 14, a reduced image motion search unit 15, a motion search unit 16, a transform/quantization unit 17, a reduced image transform/quantization unit 18, a motion vector mode selection unit 19, a variable length encoding processor 20, an inverse transform/inverse quantization unit 21, a reconstructed image generating unit 22, a frame memory 23, an image reducing unit 24, and an image enlargement unit 25.

Among these components, the complex image region search unit 11, the image reducing unit 12, the reduced image motion search unit 15, the reduced image transform/quantization unit 18 and the motion vector mode selection unit 19 are characteristic parts of the third image processing device.

Each component will be described in detail.

The complex image area search unit 11 determines the presence or absence of a complex region in each frame for the input image.

The complexity of the image is determined by using the frequency distribution after the Fourier transform, or an evaluation value such as the sum of absolute differences (activity) between the average of the pixel values of the image and the pixel value of each pixel.

The calculated complexity may be used for control in the motion vector mode selection or the image reduction.

If it is determined that the input image is complex, similarly to a conventional case, the image is outputted to the image region dividing unit 14 without reducing all frames. If it is determined that the input image is not complex, the image is outputted to the image reducing unit 12 to reduce all frames.

The image reducing unit 12 reduces the image on a frame-by-frame basis according to a defined method. As described in conjunction with the first and second image processing devices, the scaling factor of the image reducing unit 12 is set by the control unit 211 of FIG. 1 or the control unit 311 of FIG. 2.

The reduced image region dividing unit 13 divides the image, which has been reduced on a frame-by-frame basis, into macroblocks (e.g., 16 vertical pixels×16 horizontal pixels), and outputs each of the macroblocks.

The image region dividing unit 14 divides the image, which has not been reduced, into macroblocks.

Further, the macroblock outputted from the reduced image region dividing unit 13 has the same image size as that of the macroblock outputted from the image region dividing unit 14. However, compared with the same original data, the number of macroblocks outputted from the reduced image region dividing unit 13 is reduced.

The reduced image motion search unit 15 searches for the location of a region, which is similar to a target image, in a reference image by reducing the input macroblock, and outputs a difference image which is a difference from the reference image and information of the reference image and the reduced motion vector.

Specifically, the reduced image motion search unit 15 receives the macroblock (16 vertical pixels×16 horizontal pixels) of the image, a frame of which has been reduced, from the reduced image region dividing unit 13, and receives the macroblock (16 vertical pixels×16 horizontal pixels) of the image, a frame of which has not been reduced, from the image region dividing unit 14. The reduced image motion search unit 15 reduces the input macroblock to produce a reduced macroblock (8 vertical pixels×8 horizontal pixels).

Further, the reduced image motion search unit 15 acquires a reference image from the frame memory 23.

At that time, the reduced image motion search unit 15 acquires the reference image without reduction if the reference image is reduced, and acquires the reference image reduced through the image reducing unit 24 if the reference image is not reduced.

Then, the reduced image motion search unit 15 searches for the location of a region, which is similar to the target image, in the reference image by, e.g., a block matching method. The determination of the similar region is performed by using the Sum of Absolute Differences (SAD) or the Sum of Square Differences (SSD) between the pixels of the reference image and the pixels of the target image according to the motion.

Then, the reduced image motion search unit 15 outputs, as a result of the motion search, the reduced motion vector to the motion vector mode selection unit 19, and transmits the difference image between the target image and the reference image and the information of the reference image to the reduced image transform/quantization unit 18.

The motion search unit 16 searches for the location of a region, which is similar to the target image, in the reference image for the macroblock that has not been reduced, and transmits a difference image which is a difference from the reference image and information of the reference image and the motion vector.

Specifically, the motion search unit 16 receives the macroblock of the image, a frame of which has been reduced, from the reduced image region dividing unit 13, and receives the macroblock of the image, a frame of which has not been reduced, from the image region dividing unit 14. Each macroblock to be inputted is 16 vertical pixels×16 horizontal pixels.

The motion search unit 16 receives the reference image enlarged through the image enlargement unit 25 if the reference image from the frame memory 23 is reduced, and receives the reference image without enlargement if the reference image is not reduced.

Then, the motion search unit 16 searches for the location of a region, which is similar to the target image, in the reference image by, e.g., a block matching method to detect a motion vector. The motion search unit 16 transmits the motion vector to the motion vector mode selection unit 19 and the difference image between the target image and the reference image and the information of the reference image to the transform/quantization unit 17.

The reduced image transform/quantization unit 18 receives the difference image for the image, a region of which has been reduced, performs transformation such as Discrete Cosine Transform (DCT) and quantization of transform coefficients, and transmits the transform coefficients after quantization and the input difference image to the motion vector mode selection unit 19.

Figure 7:
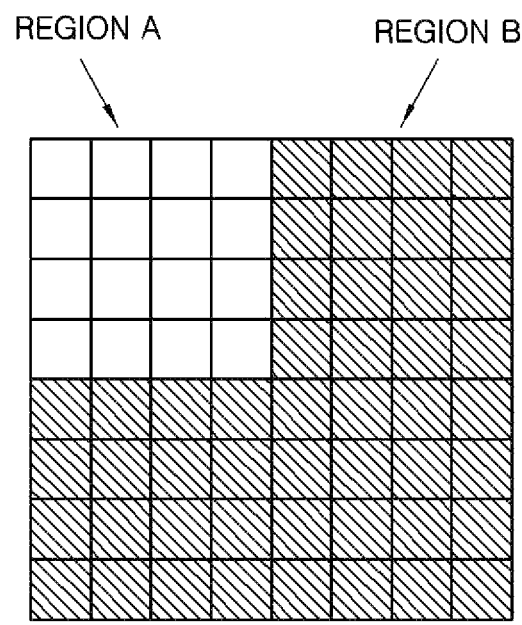
FIG. 7 is a schematic explanatory diagram showing the transform quantization of the reduced image.

The transform quantization of the reduced image transform/quantization unit 18 will be described with reference to FIG. 7. FIG. 7 is a schematic explanatory diagram showing the transform quantization of the reduced image. As shown in FIG. 7, for example, when performing transformation on the image whose motion vector has not been reduced into 8 vertical pixels×8 horizontal pixels, the transform quantization is performed on the reduced image into 4 vertical pixels×4 horizontal pixels to calculate the quantized transform coefficients of 4 vertical pixels×4 horizontal pixels, which are substituted into a matrix of the quantized transform coefficients of 8 vertical pixels×8 horizontal pixels. The substitution positions correspond to a region A of FIG. 7.

The transform/quantization unit 17 receives the difference image of a region which has not been reduced from the motion search unit 16, and performs transformation such as DCT and quantization of the transform coefficients. The transform coefficients after quantization and the input difference image are transmitted to the motion vector mode selection unit 19.

The motion vector mode selection unit 19 determines whether the motion vector is reduced for each region, and outputs the motion vector which has been reduced or the motion vector which has not been reduced as motion vector information.

Specifically, the motion vector mode selection unit 19 receives the motion vector and the reduced motion vector from the motion search unit 16 and the reduced image motion search unit 15, respectively, and receives the transform coefficients after quantization and the difference images from the transform/quantization unit 17 and the reduced image transform/quantization unit 18, respectively.

Then, the motion vector mode selection unit 19 determines whether to use the motion vector which has been reduced or the motion vector which has not been reduced for the target region based on the number of coefficients other than 0 in the transform coefficients from the transform/quantization unit 17.

The determination of the presence or absence of reduction is made using one or both of whether the number of transform coefficients after quantization of a region which has not been reduced exceeds a preset threshold value and whether all transform coefficients of a region B are zero in a state of transform coefficients after quantization shown in FIG. 7. As the determination method, other methods may be used.

If the reduced motion vector is selected based on the determination result, the motion vector mode selection unit 19 selects the reduced motion vector as the motion vector information, and transmits the reduced motion vector along with the transform coefficients outputted from the reduced image transform/quantization unit 18 and the information of the reference image to the variable length encoding unit 20.

On the other hand, if the motion vector is selected, the motion vector, the transform coefficients outputted from the transform/quantization unit 17 and the information of the reference image are transmitted to the variable length encoding unit 20.

Further, based on the same determination result, the motion vector mode selection unit 19 outputs the transform coefficients of the image, a region of which has not been reduced, and the information of the reference image, or the transform coefficients of the image, a region of which has been reduced, and the information of the reference image to the inverse transform/inverse quantization unit 21.

The variable length encoding unit 20 performs encoding on the motion vector information (motion vector or reduced motion vector) from the motion vector mode selection unit 19 and the quantized transform coefficients by a predetermined variable length coding method to be superimposed on the output stream.

Further, the variable length encoding unit 20 encodes and superimposes various kinds of header information based on the set information. Image size information indicating the image size of the frame is included in the header.

The inverse transform/inverse quantization unit 21 performs inverse quantization and inverse transformation by using the quantized transform coefficients transmitted from the motion vector mode selection unit 19 to generate a reconstructed difference image.

Then, the reconstructed difference image and the reference image are transmitted to the reconstructed image generating unit 22.

When the quantized transform coefficients are in a state of transform coefficients after quantization shown in FIG. 7, if the transform coefficients of the region B are zero, a portion of the region A of FIG. 7 is extracted from the coefficients of 8 vertical pixels×8 horizontal pixels and is subjected to inverse transformation and inverse quantization of 4 vertical pixels×4 horizontal pixels. As a result, a region of the difference image which has been reduced is generated.

If the transform coefficients of the region B are not zero, inverse transformation and inverse quantization of 8 vertical pixels×8 horizontal pixels are performed. As a result, a region of the difference image which has not been reduced is generated.

The reconstructed image generating unit 22 generates a reconstructed image by using the reconstructed difference image and the reference image, and writes the reconstructed image at the corresponding position of the frame memory. That is, the reduced region and the non-reduced region are mixed and written as the reconstructed image to the frame memory 23.

The image reducing unit 24 reduces the image inputted from the frame memory 23.

The image enlargement unit 25 enlarges the image inputted from the frame memory 23.

(Configuration of the Decoding Processor)

Next, the configuration of the decoding processor of the third image processing device will be described with reference to FIG. 6. FIG. 6 is a block diagram of the decoding processor of the third image processing device.

As shown in FIG. 6, the decoding processor of the third image processing device includes a variable length decoding unit 31, an image size determination unit 32, an inverse transform/inverse quantization unit 33, a motion vector mode determination unit 34, a motion compensation unit 35, an image enlargement unit 36, a reconstructed image enlargement unit 37, a frame memory 38, and a reference image enlargement/reduction unit 39.

Among these components, the image size determination unit 32, the motion vector mode determination unit 34, the image enlargement unit 36, the reconstructed image enlargement unit 37 and the reference image enlargement/reduction unit 39 are characteristic parts of the third image processing device.

Each component will be described in detail.

The variable length decoding unit 31 variable-length decodes the input encoded stream, and outputs the quantized transform coefficients or the header information.

The image size determination unit 32 transmits the information of the quantized transform coefficients to the inverse transform/inverse quantization unit 33, determines the image size by retrieving the image size information of the corresponding frame, and transmits the image size determination information indicating whether the corresponding frame has been reduced to the motion vector mode determination unit 34.

The motion vector mode determination unit 34 extracts the motion vector information based on the quantized coefficients outputted from the variable length decoding unit 31, determines whether the motion vector has been reduced, and outputs the motion vector determination information.

The motion vector mode determination unit 34 receives the motion vector information and the quantized transform coefficients of the corresponding macroblock from the variable length decoding unit 31, and at the same time acquires the image size determination information of the corresponding frame from the image size determination unit 32.

The determination on whether the motion vector has been reduced in the motion vector mode determination unit 34 will be described.

The motion vector mode determination unit 34 calculates the number of quantized transform coefficients as an evaluation value, and determines and outputs whether to reduce the image or not in performing a motion compensation process, based on whether the evaluation value is smaller than a preset threshold value or whether all the quantized transform coefficients of the region B of FIG. 7 are zero, as the motion vector determination information.

Then, the motion vector mode determination unit 34 transmits the motion vector determination information and the image size determination information to the motion compensation unit 35 and the reference image enlargement/reduction unit 39.

The motion compensation unit 35 selects a reference region from the reference image according to the motion vector or the reduced motion vector obtained as the motion vector information, and calculates the pixel sum of the reconstructed difference image to generate a reconstructed image.

Further, the motion compensation unit 35 specifies an enlargement ratio according to the image size determination information and the motion vector determination information, and transmits the enlargement ratio to the reconstructed image enlargement unit 37 and the image enlargement unit 36.

The image enlargement unit 36 enlarges and outputs the reconstructed image transmitted from the motion compensation unit 35 according to the enlargement ratio transmitted from the motion compensation unit 35.

The reconstructed image enlargement unit 37 enlarges the reconstructed image according to the enlargement ratio transmitted from the motion compensation unit 35, and writes the enlarged reconstructed image to the frame memory 38.

The reference image enlargement/reduction unit 39 determines the enlargement ratio or reduction ratio of the image extracted from the frame memory 38 based on the image size determination information and the motion vector determination information from the motion vector mode determination unit 34, and performs enlargement/reduction of the image. The enlarged/reduced reference image is transmitted to the motion compensation unit 35.

(Processing of the Encoding Processor of the Third Image Processing Device)

Figure 8:
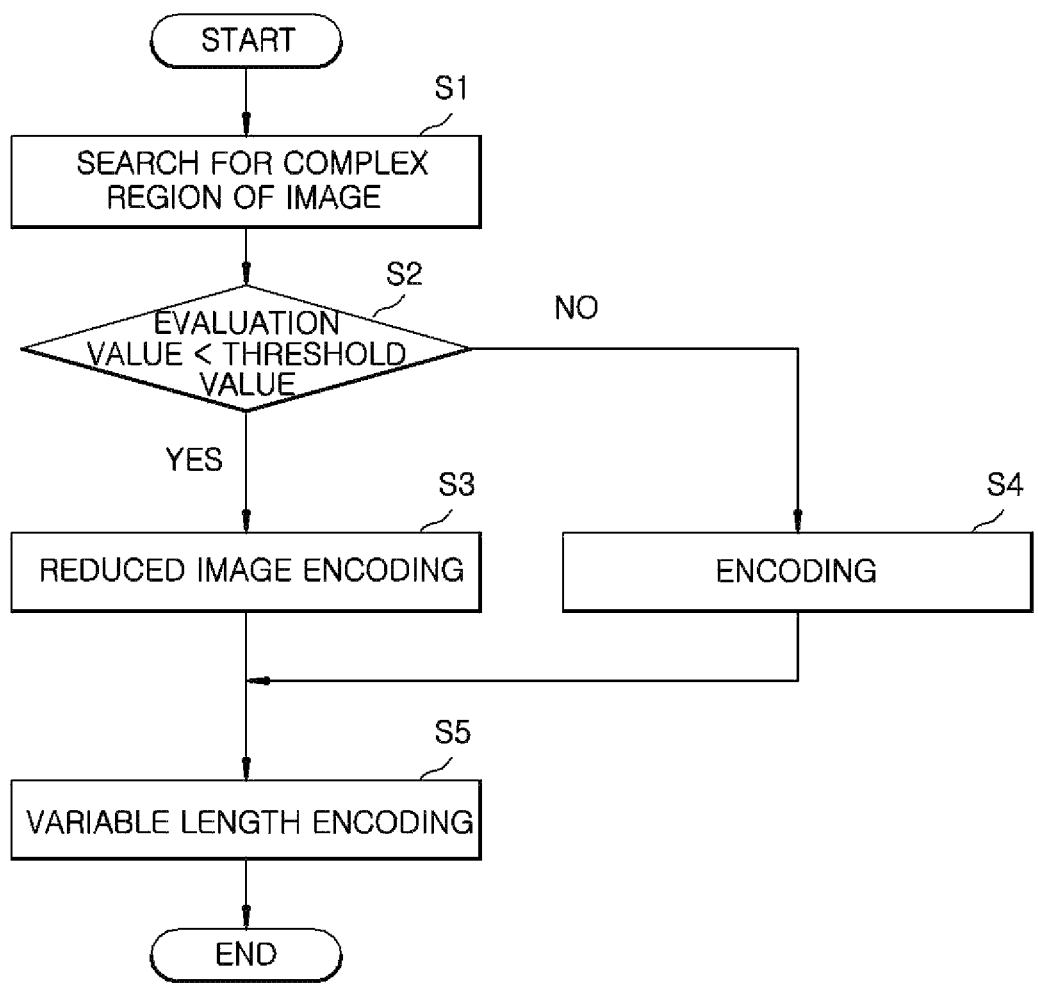
FIG. 8 is a flowchart showing the processing in the encoding processor of the third image processing device.

Next, the processing in the encoding processor of the third image processing device will be described with reference to FIG. 8. FIG. 8 is a flowchart showing the processing in the encoding processor of the third image processing device.

As shown in FIG. 8, in the encoding processor, when an image is inputted, the complex image region search unit 11 performs a process of searching for a complex region of the image (S1).

The evaluation value outputted as a result is compared with the set threshold value (S2). If the evaluation value is smaller than the set threshold value, a reduced image encoding process (S3) is performed. If the evaluation value is equal to or greater than the threshold value, an image encoding process (S4) is performed. The threshold value in the processing of FIG. 8 is equivalent to a first threshold value as described in claims.

The reduced image encoding process and the image encoding process will be described later.

That is, in the third image processing device, depending on the complexity of the image, the reduced image encoding process is performed to reduce all frames if the image is not complex, and the encoding process is performed without reduction if the image is complex. Thus, it is possible to improve the compression ratio without degrading the image quality of the complex region.

The encoding processor performs variable-length encoding in the variable length encoding unit 20 using the resultant information of the reduced image encoding process or the image encoding process (S5), and outputs an encoded stream.

In this manner, the overall operation of the encoding processor is performed.

As a feature of the third image processing device, in each of the reduced image encoding process (S3) and the image encoding process (S4), for each region on which motion compensation is performed, whether to perform the reduction of the motion vector is selected according to the complexity of the region, thereby achieving an improvement in the compression ratio as a whole. Each process will be described later.

Figure 9:
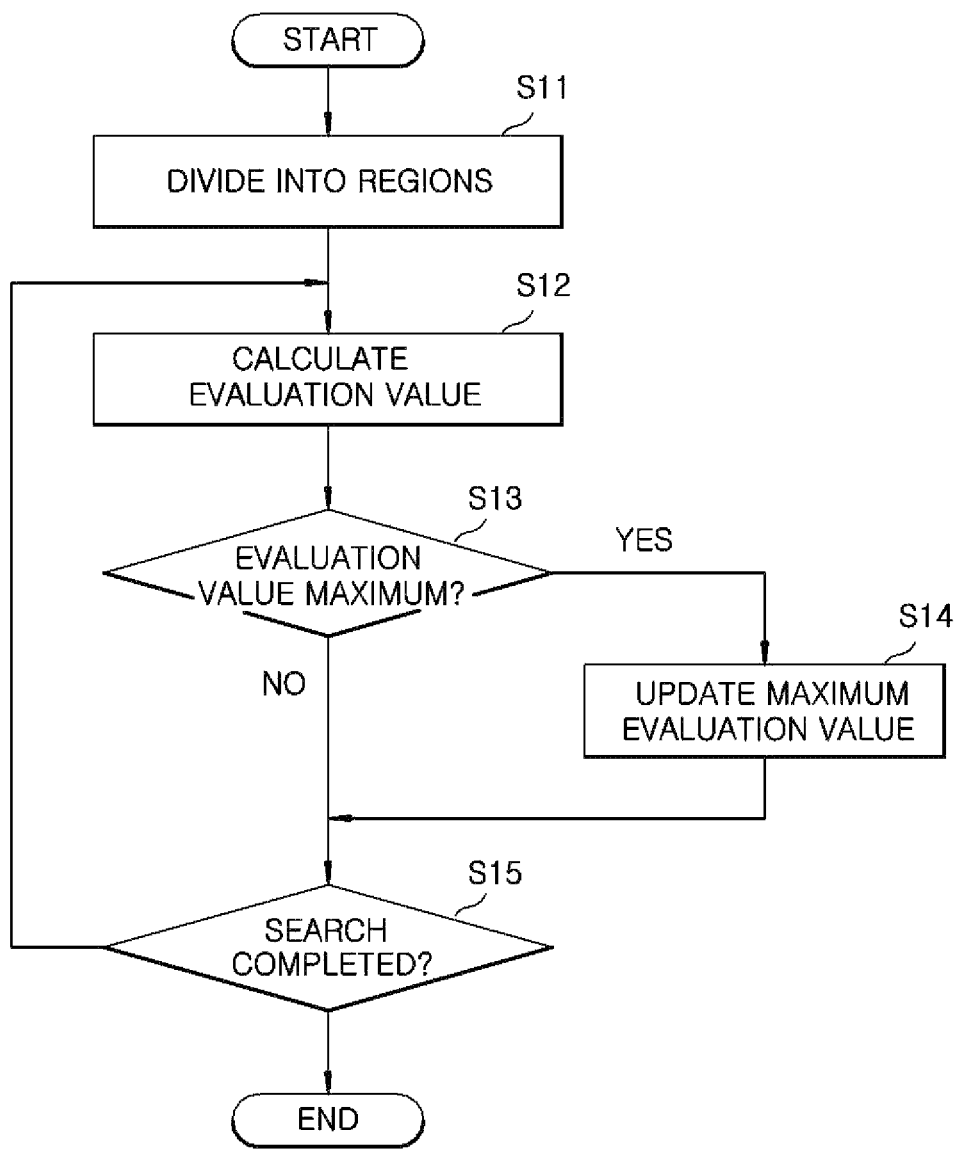
FIG. 9 is a flowchart illustrating a process of searching for a complex region of the image.

Next, a process of searching for a complex region of the image shown in step S1 of FIG. 8 will be described with reference to FIG. 9. FIG. 9 is a flowchart illustrating a process of searching for a complex region of the image.

As shown in FIG. 9, the complex image region search unit 11 divides the input image of one frame into regions of, e.g., 16 vertical pixels×16 horizontal pixels (S11).

The complex image region search unit 11 calculates, for each divided region, an evaluation value using the frequency distribution after the Fourier transform or the sum of absolute differences between the average of the pixel values of the image and the pixel value of each pixel (S12).

The complex image region search unit 11 compares the calculated evaluation value with the maximum value (maximum evaluation value) of the evaluation values which have been previously calculated and stored, and determines whether the calculated evaluation value is maximum (S13).

If it is maximum, the maximum evaluation value is updated to the calculated evaluation value (S14).

The complex image region search unit 11 determines whether both the calculation of the evaluation value and the comparison between the calculated evaluation value and the maximum evaluation value have been completed for the region to be searched (S15). If not completed, the process proceeds to step S12 and executes the same processing after extracting the next region.

In step S15, if the process for all the regions has been completed, the search for a complex region of the image is ended.

By performing the process of FIG. 9 for each frame, the evaluation value stored as the maximum evaluation value at the end of the process becomes an evaluation value indicating the complexity of the image of each frame, and is compared with the threshold value in step S2 of FIG. 8.

Figure 10:
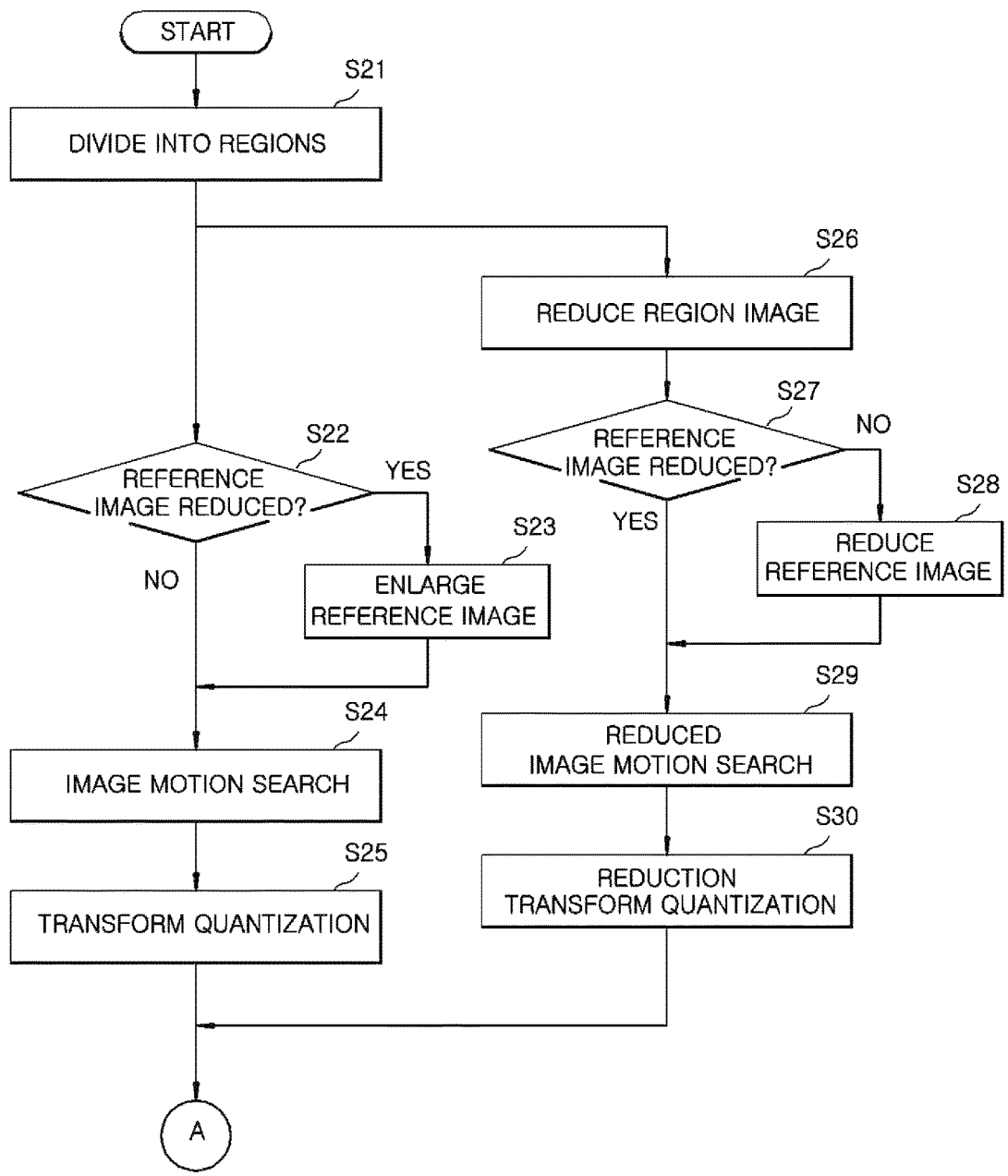
FIGS. 10 and 11 are a flowchart showing the image encoding process shown in step S4 of FIG. 8.
Figure 11:
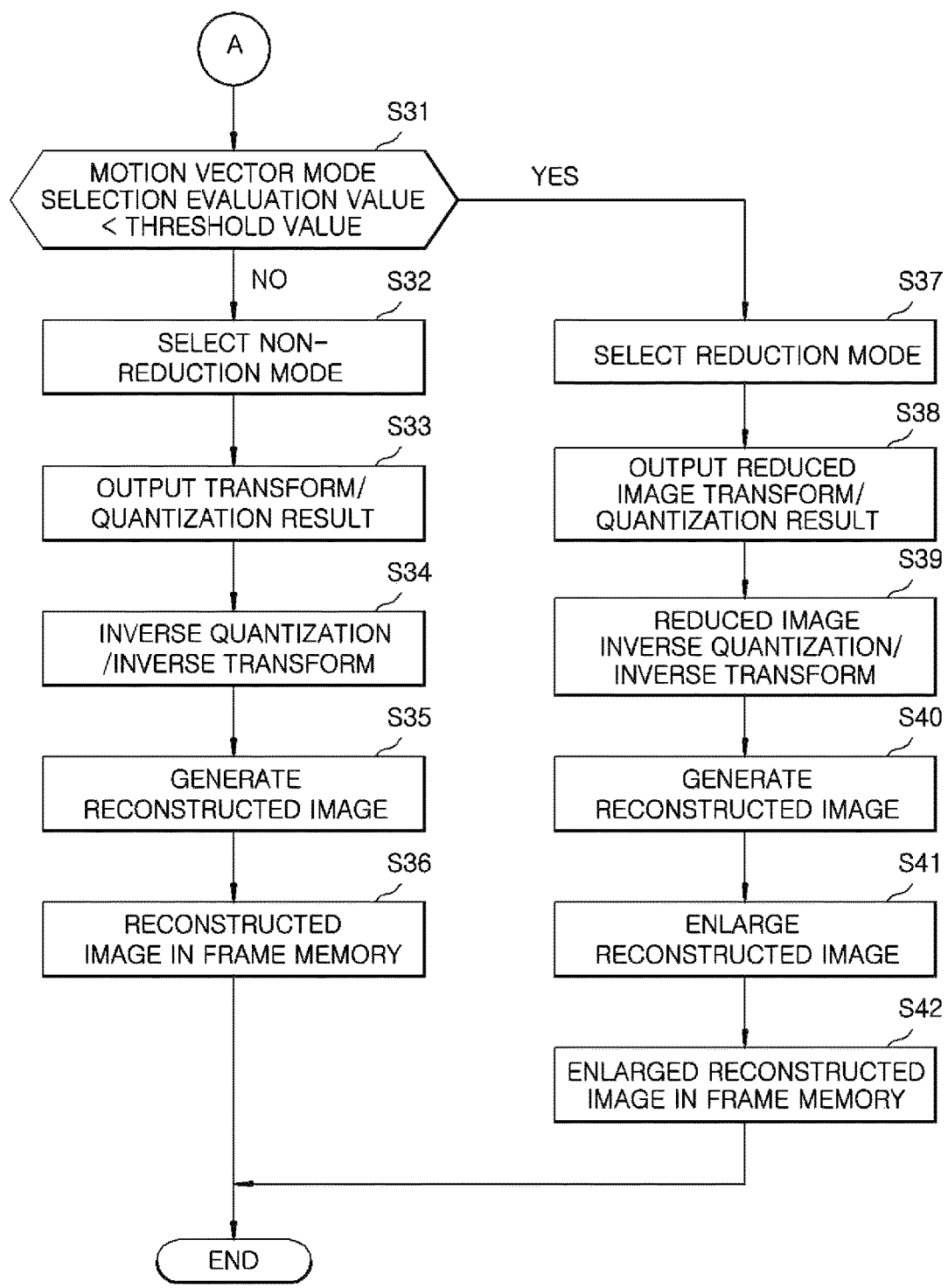

Next, the image encoding process shown in step S4 of FIG. 8 will be described in detail with reference to FIGS. 10 and 11. FIGS. 10 and 11 are a flowchart illustrating the image encoding process shown in step S4 of FIG. 8.

The image encoding process is performed when the reduction is not carried out on a frame-by-frame basis. The process shown in FIGS. 10 and 11 is performed continuously.

First, in the image encoding process, a process until the quantized transform coefficients are calculated will be described with reference to FIG. 10. As shown in FIG. 10, in the encoding processor, first, the image region dividing unit 14 divides a frame image into macroblocks (16 vertical pixels×16 horizontal pixels) (S21).

Then, as a feature of the third image processing device, the image region dividing unit 14 performs a flow which reduces the region image in parallel with a flow which does not reduce the region image in order to determine whether to reduce the motion vector. Therefore, in FIG. 5, the image region dividing unit 14 outputs the divided region image to both the reduced image motion search unit 15 and the motion search unit 16.

Specifically, in the flow (left) which does not reduce the motion vector (does not reduce the region), the motion search unit 16 checks whether the reference image has been reduced (S22). If the reference image has been reduced (Yes in step S22), the reference image is acquired after being enlarged by the image enlargement unit 25 (S23).

If the reference image has not been reduced (No in step S22), the reference image is used as it is.

The motion search unit 16, as an image motion search, performs block matching by using a region-divided target image and a reference image to extract a region similar to the target image. A difference between the positions of the extracted region and the region of the target image is detected as the motion vector (S24). Further, an image obtained by a difference value of each pixel between the extracted region and the region of the target image is generated as a difference image. The size of the difference image is 16 vertical pixels×16 horizontal pixels.

Then, the transform/quantization unit 17 performs transform quantization on the difference image and outputs the quantized transform coefficients (S25), and the process proceeds to "(A)".

On the other hand, in the flow (right) which reduces the motion vector (reduces the region), the reduced image motion search unit 15 receives the region image which has not been reduced from the image region dividing unit 14 and reduces the region image (S26).

Then, the reduced image motion search unit 15 checks whether the reference image has been reduced (S27). If the reference image has not been reduced (No in step S27), the reference image is acquired after being reduced by the image reducing unit 24 (S28). If the reference image has been reduced (Yes in step S27), the reference image is used as it is.

Further, the reduced image motion search unit 15, as a reduced image motion search, extracts a region similar to the target image from the reference image, and detects a difference between the positions of the extracted region and the region of the target image as the reduced motion vector (S29). Further, an image obtained by a difference value of each pixel between the extracted region and the region of the target image is generated as a difference image. The size of the difference image is 8 vertical pixels×8 horizontal pixels.

Then, the reduced image transform/quantization unit 18 performs transform quantization on the difference image to calculate the quantized transform coefficients (S25), and the process proceeds to "(A)".

Thus, for the image, all frames of which have not been reduced, the transform coefficients when the motion vector is reduced and when the motion vector is not reduced are calculated and outputted to the motion vector mode selection unit 19.

Next, in the image encoding process, a process of selecting a motion vector mode and generating a reconstructed image will be described with reference to FIG. 11. As shown in FIG. 11, when the transform coefficients are calculated and inputted to the motion vector mode selection unit 19, the motion vector mode selection unit 19 calculates an evaluation value (motion vector mode selection evaluation value) for selecting the motion vector mode, and determines whether to select one of the reduced motion vector and the non-reduced motion vector.

As the motion vector mode selection evaluation value, the number of quantized transform coefficients of a flow that does not reduce the region, or a value indicating whether all the quantized transform coefficients of the region B shown in FIG. 7 are zero is used.

These are values that represent the complexity of each region.

In this case, the number of quantized transform coefficients of a flow that does not reduce the region is used as the motion vector mode selection evaluation value, and the motion vector mode selection unit 19 determines whether it is smaller than a threshold value (S31). The threshold value in step S31 is equivalent to a second threshold value as described in claims.

If the motion vector mode selection evaluation value is equal to or greater than the threshold value (No in step S31), the motion vector mode selection unit 19 selects a non-reduction mode (S32), and outputs the quantized transform coefficients without reduction from the transform/quantization unit 17 (S33).

Then, the inverse transform/inverse quantization unit 21 performs inverse quantization and inverse transformation by using the output results of the transform quantization (S34), and generates a reconstructed difference image (S35).

Then, the reconstructed image generating unit 22 generates a reconstructed image from the reconstructed difference image and the reference image generated from the motion search unit 16 (S35), stores the generated reconstructed image in the frame memory 23 (S36), and ends the process.

The reconstructed image stored in this case becomes a non-reduced reference image (16 vertical pixels×16 horizontal pixels).

Further, if the motion vector mode selection evaluation value is smaller than the threshold value (Yes in step S31), the motion vector mode selection unit 19 selects a reduction mode (S37), and outputs the reduced transform coefficients after quantization from the reduced image transform/quantization unit 18 (S38).

Then, inverse transformation and inverse quantization of the reduced image are performed by using the reduced transform coefficients after quantization (S39), and the reconstructed image generating unit 22 generates a reconstructed image (S40). The reconstructed image is enlarged (S41) and stored in the frame memory (S42), and the process is ended.

In this case, a reduced reference image (8 vertical pixels×8 horizontal pixels) can be obtained.

In this manner, the image encoding process when all frames are not reduced is performed.

Figure 12:
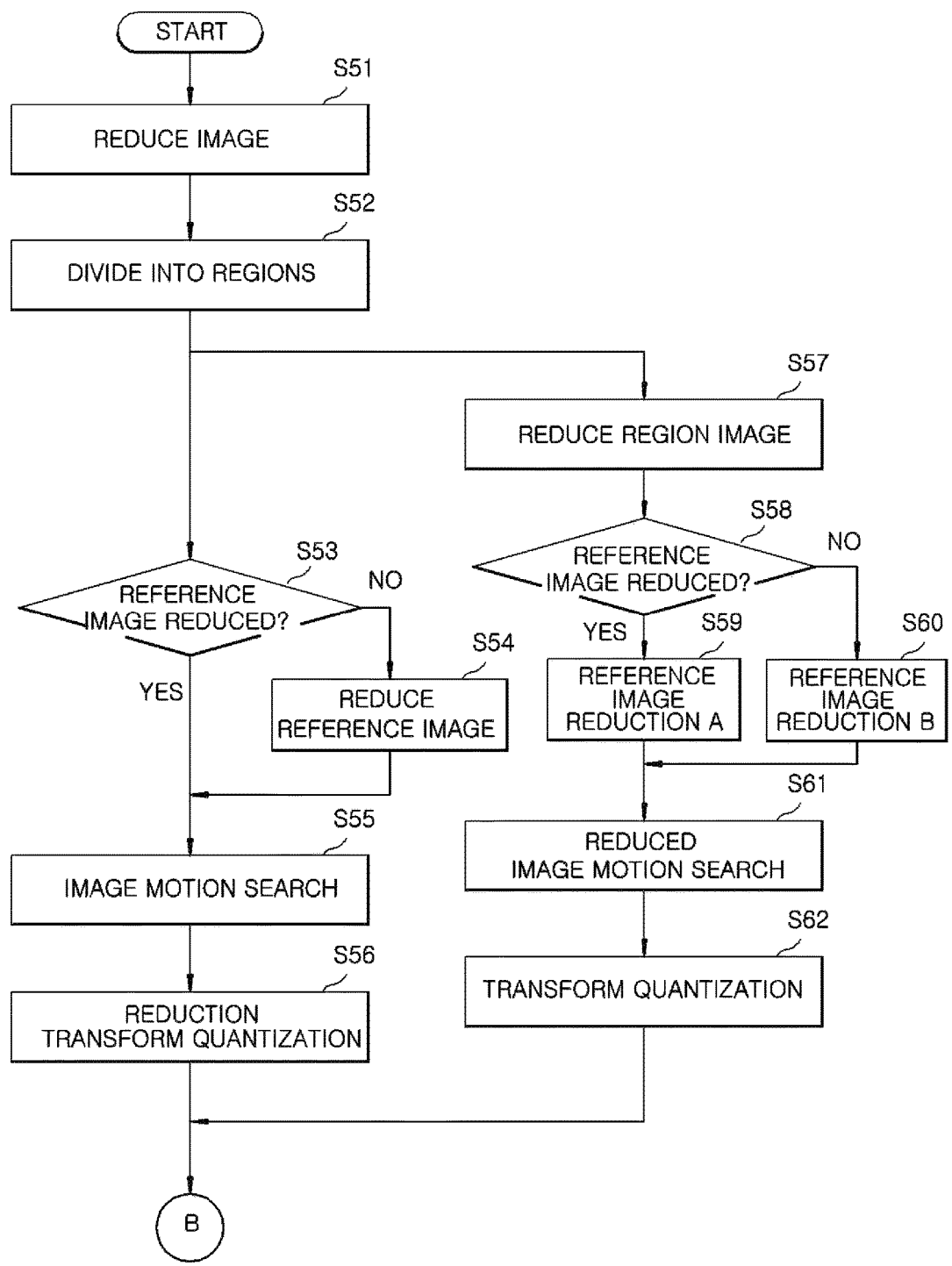
FIGS. 12 and 13 are a flowchart showing the reduced image encoding process shown in step S3 of FIG. 8.
Figure 13:
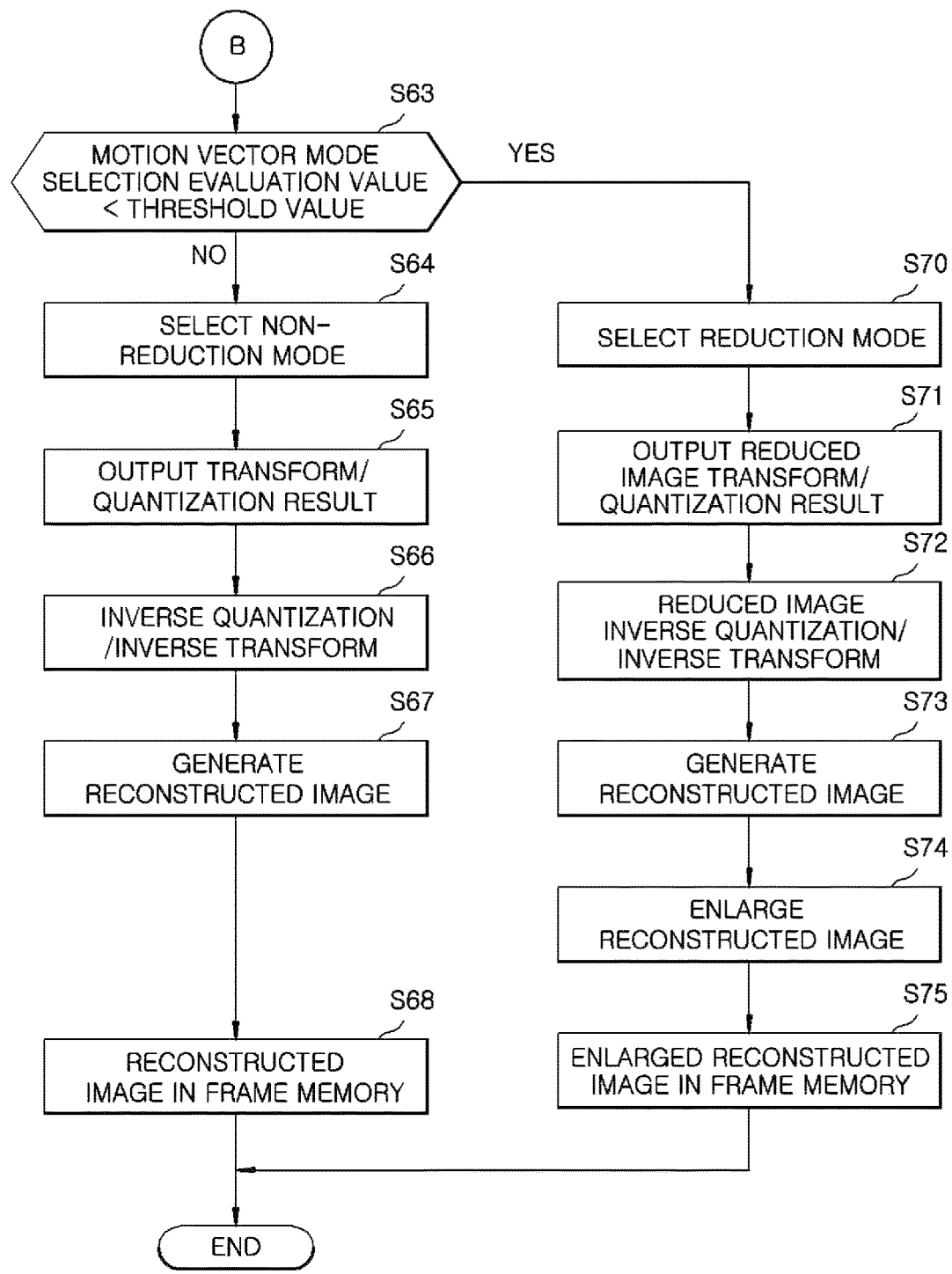

(Reduced Image Encoding Process: FIGS. 12 and 13)

Next, the reduced image encoding process shown in step S3 of FIG. 8 will be described in detail with reference to FIGS. 12 and 13. FIGS. 12 and 13 are a flowchart illustrating the reduced image encoding process shown in step S3 of FIG. 8.

The reduced image encoding process is performed when the reduction is carried out on a frame-by-frame basis. The process shown in FIGS. 12 and 13 is performed continuously.

Further, since a basic flow of the reduced image encoding process is the same as that of the image encoding process shown in FIGS. 10 and 11, only differences will be described.

First, in the reduced image encoding process, a process until the quantized transform coefficients are calculated will be described with reference to FIG. 12. As shown in FIG. 12, as a feature of the reduced image encoding process, first, the image reducing unit 12 reduces the input image on a frame-by-frame basis (S51).

Then, the reduced image region dividing unit 13 divides the reduced image into macroblocks (16 vertical pixels×16 horizontal pixels) (S52), and performs a flow which does not reduce the motion vector (does not reduce the region) in parallel with a flow which reduces the motion vector (reduces the region).

That is, in FIG. 5, the reduced image region dividing unit 13 outputs an image of the divided region to both the reduced image motion search unit 15 and the motion search unit 16.

Here, the region of 16 vertical pixels×16 horizontal pixels divided by the reduced image region dividing unit 13 corresponds to a region of 32×32 pixels in the original image before frame reduction.

In the flow (left) which does not reduce the motion vector, the motion search unit 16 checks whether the reference image has been reduced (S53). If the reference image has not been reduced (No in step S53), the reference image is acquired after being reduced to 16 vertical pixels×16 horizontal pixels through the image reducing unit 24 (S54). If the reference image has been reduced (Yes in step S53), the reference image is used as it is.

The motion search unit 16 performs block matching by using a region-divided target image and a reference image to extract a region similar to the target image, and performs an image motion search that detects, as a motion vector, a difference in position therebetween (S55) to generate a difference image.

Then, the transform/quantization unit 17 performs transform quantization on the difference image to calculate the quantized transform coefficients (S56), and the process proceeds to "(B)".

On the other hand, in the flow (right) which reduces the motion vector, the reduced image motion search unit 15 reduces the input region image (S57). Thus, the target region on which the motion search is performed is reduced on a frame-by-frame basis, and the region has a reduced size.

The reduced image motion search unit 15 checks whether the reference image has been reduced (S58). If the reference image has been reduced, after the image reducing unit 24 performs reference image reduction A, the reference image is acquired (S59), and the process proceeds to step S61.

The reference image reduction A is a process of reducing the reference image to ½ both vertically and horizontally.

Further, in step S58, if the reference image has not been reduced, the image reducing unit 24 performs reference image reduction B, and the process proceeds to step S61.

The reference image reduction B is a process of reducing the reference image to ¼ both vertically and horizontally.

Then, the reduced image motion search unit 15 performs block matching by comparing the target image and the reference image which have the same size to extract a region similar to the target image from the reference image. Further, the reduced image motion search unit 15 performs a reduced image motion search to detect a reduced motion vector (S61), and generates an image obtained by a difference value of each pixel between the extracted region and the region of the target image as a difference image.

Then, the reduced image transform/quantization unit 18 performs transform quantization on the difference image to calculate the quantized transform coefficients (S62), and the process proceeds to "(B)".

Next, in the reduced image encoding process, a process of selecting a motion vector mode and generating a reconstructed image will be described briefly with reference to FIG. 13. The process shown in FIG. 13 is similar to the process shown in FIG. 11. When the transform coefficients are inputted to the motion vector mode selection unit 19, the motion vector mode selection unit 19 calculates a motion vector mode selection evaluation value and compares the motion vector mode selection evaluation value with a threshold value (S63). If the motion vector mode selection evaluation value is equal to or greater than the threshold value (No in step S63), the motion vector mode selection unit 19 selects a non-reduction mode (S64). If the motion vector mode selection evaluation value is smaller than the threshold value (Yes in step S63), the motion vector mode selection unit 19 selects a reduction mode (S70).

Then, similarly to the process shown in FIG. 11, after steps S65 to S68 are performed in the non-reduction mode and steps S71 to S75 are performed in the reduction mode, the process is ended.

The reference image obtained by the reduced image encoding process becomes a reduced reference image.

That is, in the third image processing device, the encoding processor determines whether all frames have been reduced according to the complexity of the image on a frame-by-frame basis, determines whether to perform reduction of the motion vector, i.e., reduction of the macroblock, according to the complexity of the macroblock that is a unit on which motion compensation is performed for each of cases where all frames have been reduced and where all frames have not been reduced, and performs appropriate encoding for each region, thereby improving the compression ratio while suppressing the degradation of the output image.

In the third image processing device, encoding methods depending on the presence or absence of reduction are four methods because the presence or absence of frame reduction and the presence or absence of motion vector reduction are in combination.

Figure 14:
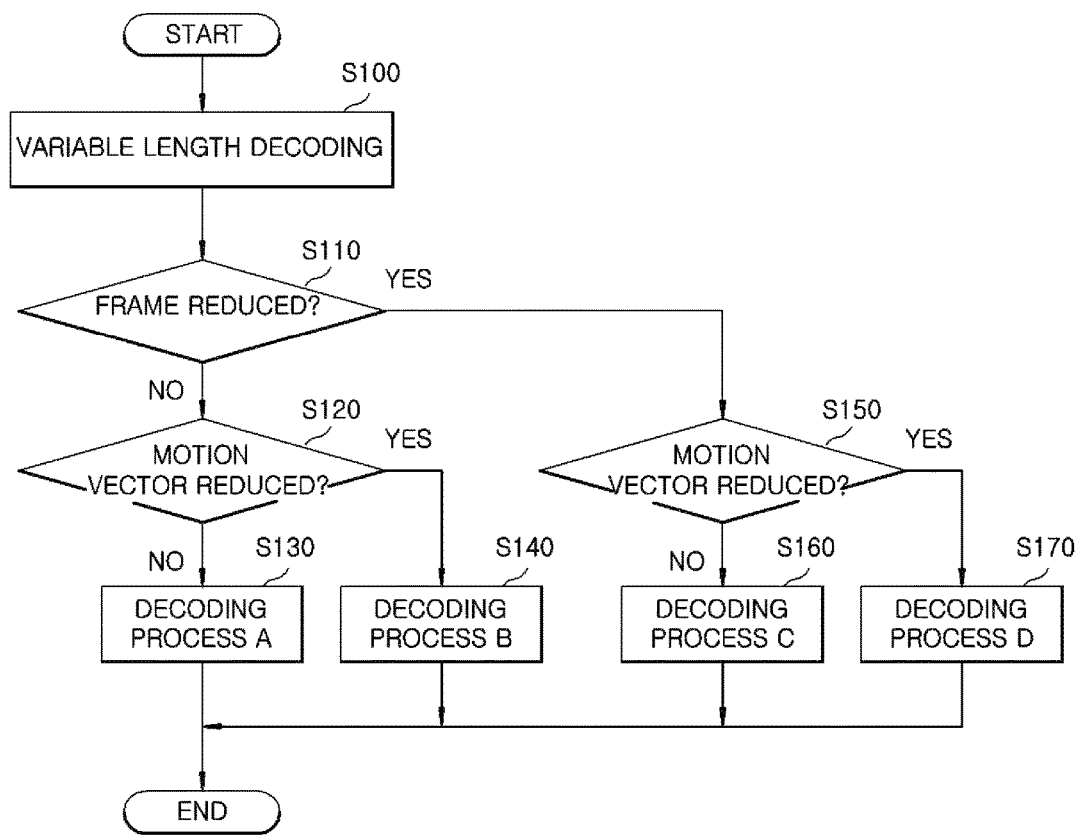
FIG. 14 is a flowchart showing an outline of the processing in the decoding processor of the third image processing device.

Next, the processing in the decoding processor of the third image processing device will be described with reference to FIG. 14. FIG. 14 is a flowchart showing an outline of the processing in the decoding processor of the third image processing device. As shown in FIG. 14, in the decoding processor, first, the variable length decoding unit 31 variable-length decodes the input stream (S100), and the image size determination unit 32 reads the size of the input frame from the header information and the like and determines whether the frame has been reduced (S110).

If the frame has not been reduced (No in step S110), the motion vector mode determination unit 34 determines whether the motion vector has been reduced (S120). If the motion vector has not been reduced (No in step S120), the decoding processor proceeds to decoding process A (S130).

Further, if the motion vector has been reduced (Yes in step S120), the decoding processor proceeds to decoding process B (S140).

If the frame has been reduced (Yes in step S110), the motion vector mode determination unit 34 determines whether the motion vector has been reduced (S150). If the motion vector has not been reduced (No in step S150), the decoding processor proceeds to decoding process C (S160).

Further, if the motion vector has been reduced (Yes in step S150), the decoding processor proceeds to decoding process D (S170).

That is, in the decoding processor of the third image processing device, four decoding methods are performed depending on the presence or absence of frame reduction and the presence or absence of motion vector reduction.

Figure 15:
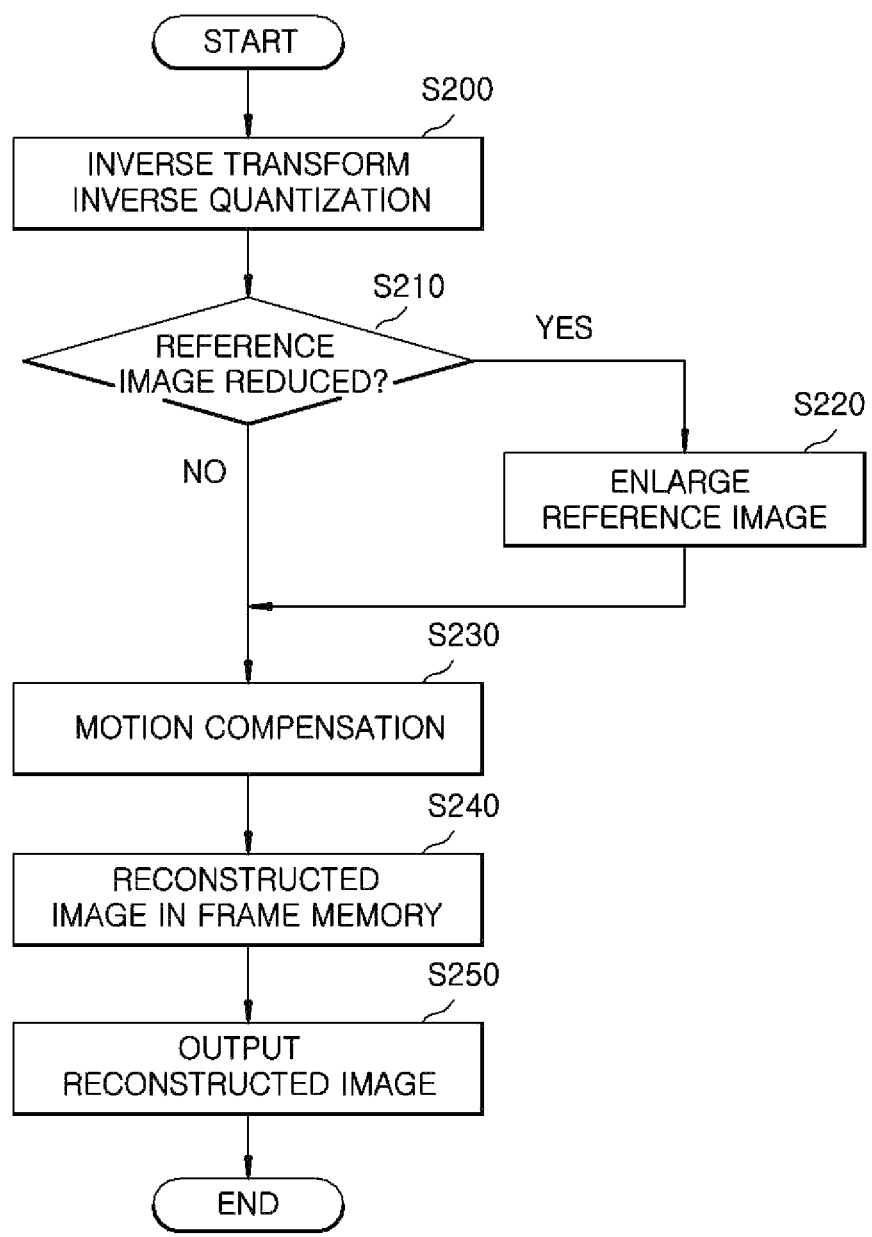
FIG. 15 is a flowchart of decoding process A shown in step S130 of FIG. 14.

The decoding process A will be specifically described with reference to FIG. 15. FIG. 15 is a flowchart of the decoding process A shown in step S130 of FIG. 14. The decoding process A is a decoding process of a region where the motion vector has not been reduced when all frames have not been reduced.

As shown in FIG. 15, in the decoding process A, the inverse transform/inverse quantization unit 33 performs inverse transformation and inverse quantization to generate a reconstructed difference image (S200).

Then, the motion compensation unit 35 determines whether the reference image to be referred to for inter-picture prediction has been reduced (S210). If the reference image has been reduced (Yes in step S210), the reference image enlargement/reduction unit 39 enlarges the reference image (S220). If the reference image has not been reduced (No in step S210), the reference image is used as it is.

Then, the motion compensation unit 35 performs a motion compensation process using the corresponding region of the reference image by using the non-reduced motion vector extracted by the variable length decoding unit 31 (S230), and generates a reconstructed image by the pixel sum of the reconstructed difference image. The reconstructed image is stored in the frame memory 38 as a reference image (S240), and finally, the reconstructed image is outputted (S250).

In this case, a non-reduced reference image can be obtained.

In this manner, the decoding process A is carried out.

Figure 16:
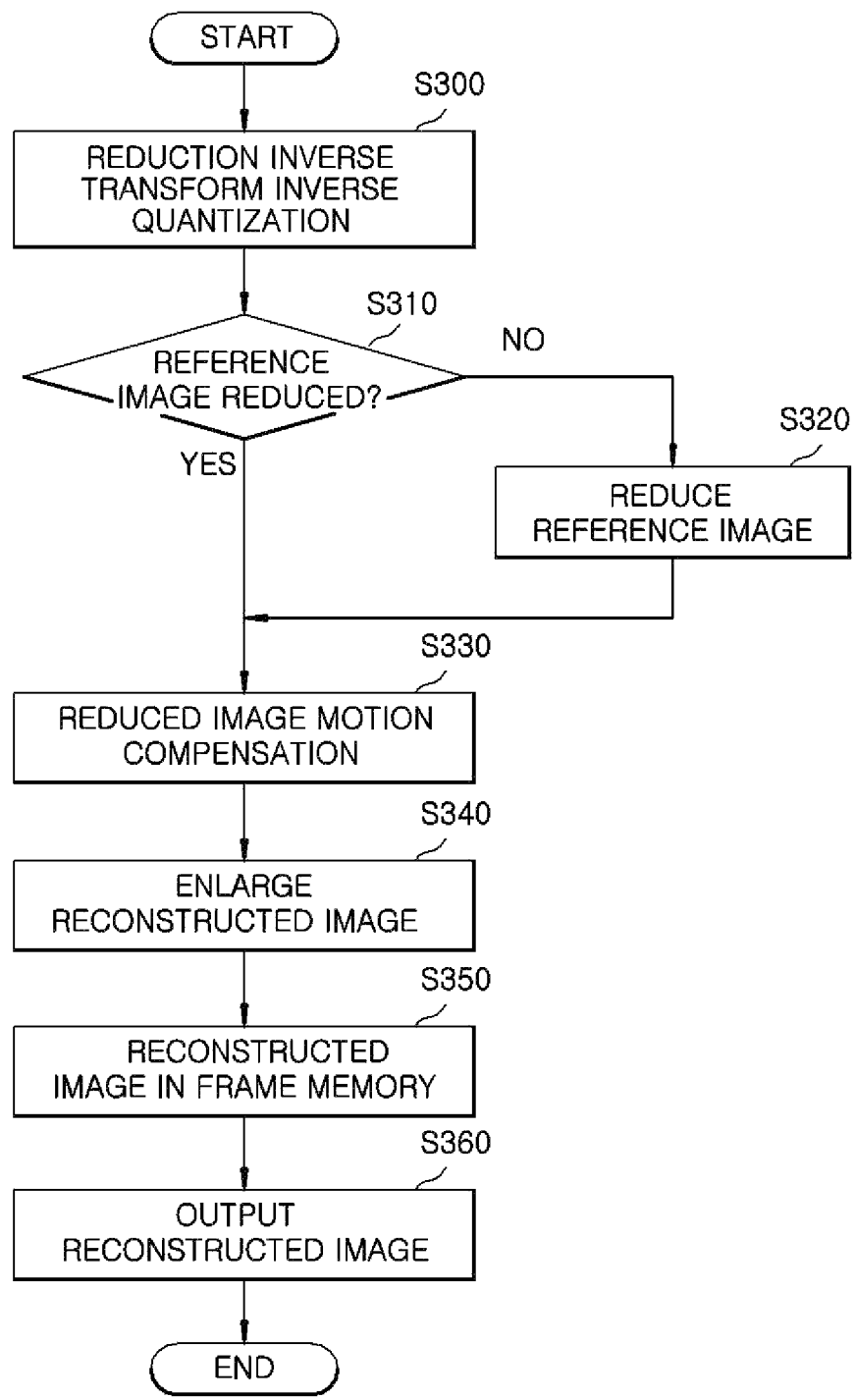
FIG. 16 is a flowchart of decoding process B shown in step S140 of FIG. 14.

Next, the decoding process B will be described with reference to FIG. 16. FIG. 16 is a flowchart of the decoding process B shown in step S140 of FIG. 14. The decoding process B is a decoding process of a region where the motion vector has been reduced when all frames have not been reduced.

As shown in FIG. 16, in the decoding process B, the inverse transform/inverse quantization unit 33 performs reduction inverse transformation and inverse quantization to generate a difference image of the reduced region (S300). Specifically, in the reduction inverse transformation and inverse quantization, a portion of the region A of FIG. 7 is extracted from the transform coefficients of 8 vertical pixels×8 horizontal pixels and is subjected to inverse transformation and inverse quantization of 4 vertical pixels×4 horizontal pixels. As a result, a reconstructed difference image which has been reduced (e.g., 8 vertical pixels×8 horizontal pixels) is generated.

Then, the motion compensation unit 35 determines whether the reference image has been reduced (S310). If the reference image has not been reduced (No in step S310), the reference image enlargement/reduction unit 39 reduces the reference image (S320). If the reference image has been reduced (Yes in step S310), the reference image is used as it is.

Then, the motion compensation unit 35 performs a reduced image motion compensation process to perform motion compensation on the reduced image using the corresponding region of the reference image by using the reduced motion vector extracted by the variable length decoding unit 31 (S330), and generates a reconstructed image by the pixel sum of the reconstructed difference image.

Then, the reconstructed image enlargement unit 37 enlarges the reconstructed image (S340), and stores the enlarged reconstructed image in the frame memory 38 (S350). Thus, a non-reduced reference image can be obtained.

Further, the motion compensation unit 35 outputs the reconstructed image to the image enlargement unit 36, and the image enlargement unit 36 enlarges the reconstructed image to its original size and outputs the enlarged reconstructed image (S360).

In this manner, the decoding process B is carried out.

Figure 17:
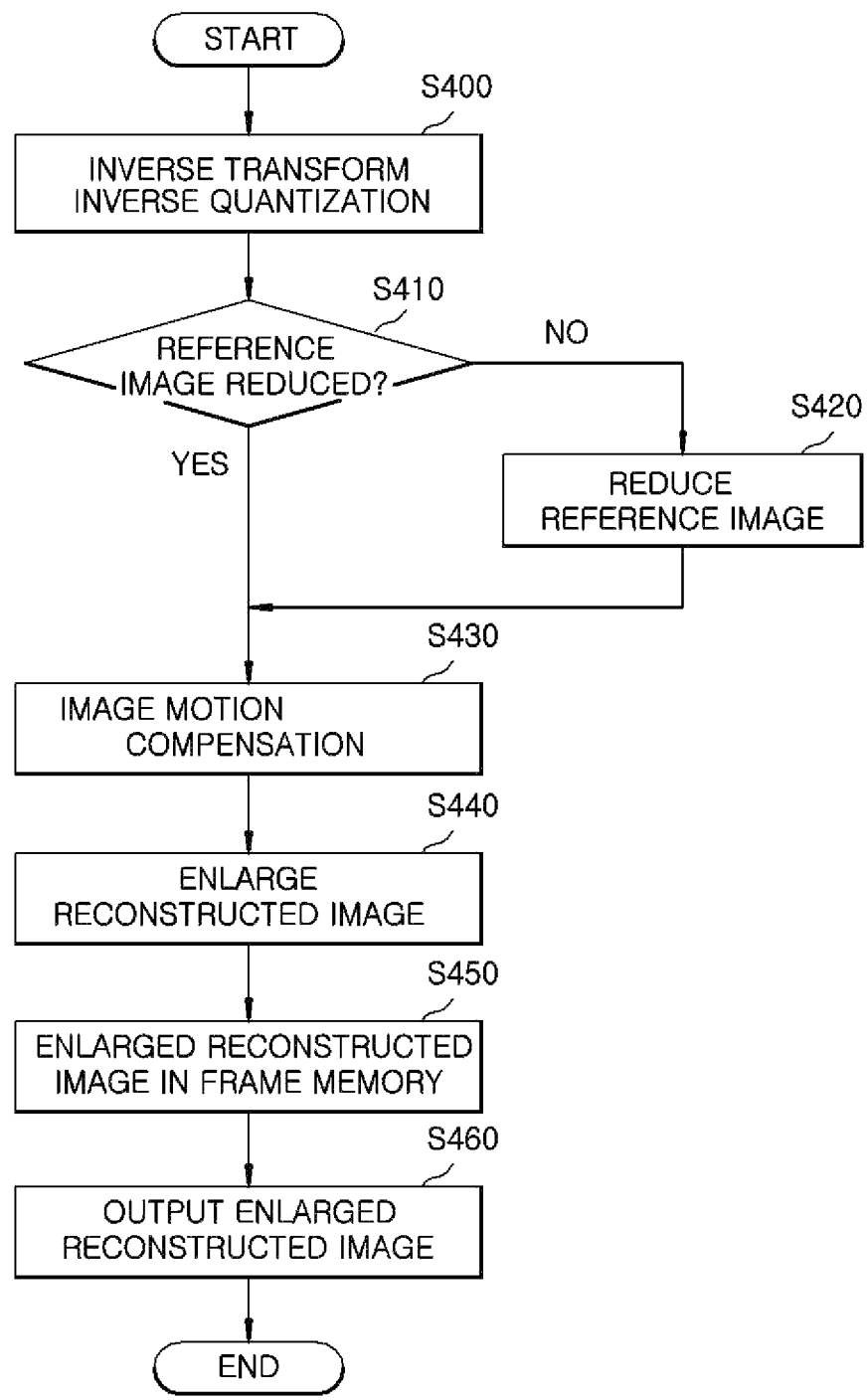
FIG. 17 is a flowchart of decoding process C shown in step S160 of FIG. 14.

Next, the decoding process C will be described with reference to FIG. 17. FIG. 17 is a flowchart of the decoding process C shown in step S160 of FIG. 14. The decoding process C is a decoding process of a region where the motion vector has not been reduced when all frames have been reduced.

As shown in FIG. 17, in the decoding process C, the inverse transform/inverse quantization unit 33 performs inverse transformation and inverse quantization to generate a reconstructed difference image (S400).

Then, the motion compensation unit 35 determines whether the reference image to be referred to for inter-picture prediction has been reduced (S410). If the reference image has not been reduced (No in step S410), the reference image enlargement/reduction unit 39 reduces the reference image (S420). If the reference image has been reduced (Yes in step S410), the reference image is used as it is.

Then, the motion compensation unit 35 performs a motion compensation process using the corresponding region of the reference image by using the non-reduced motion vector extracted by the variable length decoding unit 31 (S430), and generates a reconstructed image by the pixel sum of the reconstructed difference image.

Then, the reconstructed image enlargement unit 37 enlarges the reconstructed image (S440), and stores the enlarged reconstructed image in the frame memory 38 (S450).

Further, the motion compensation unit 35 outputs the reconstructed image to the image enlargement unit 36, and the image enlargement unit 36 enlarges the reconstructed image to its original size and outputs the enlarged reconstructed image (S460).

In this manner, the decoding process C is carried out.

Figure 18:
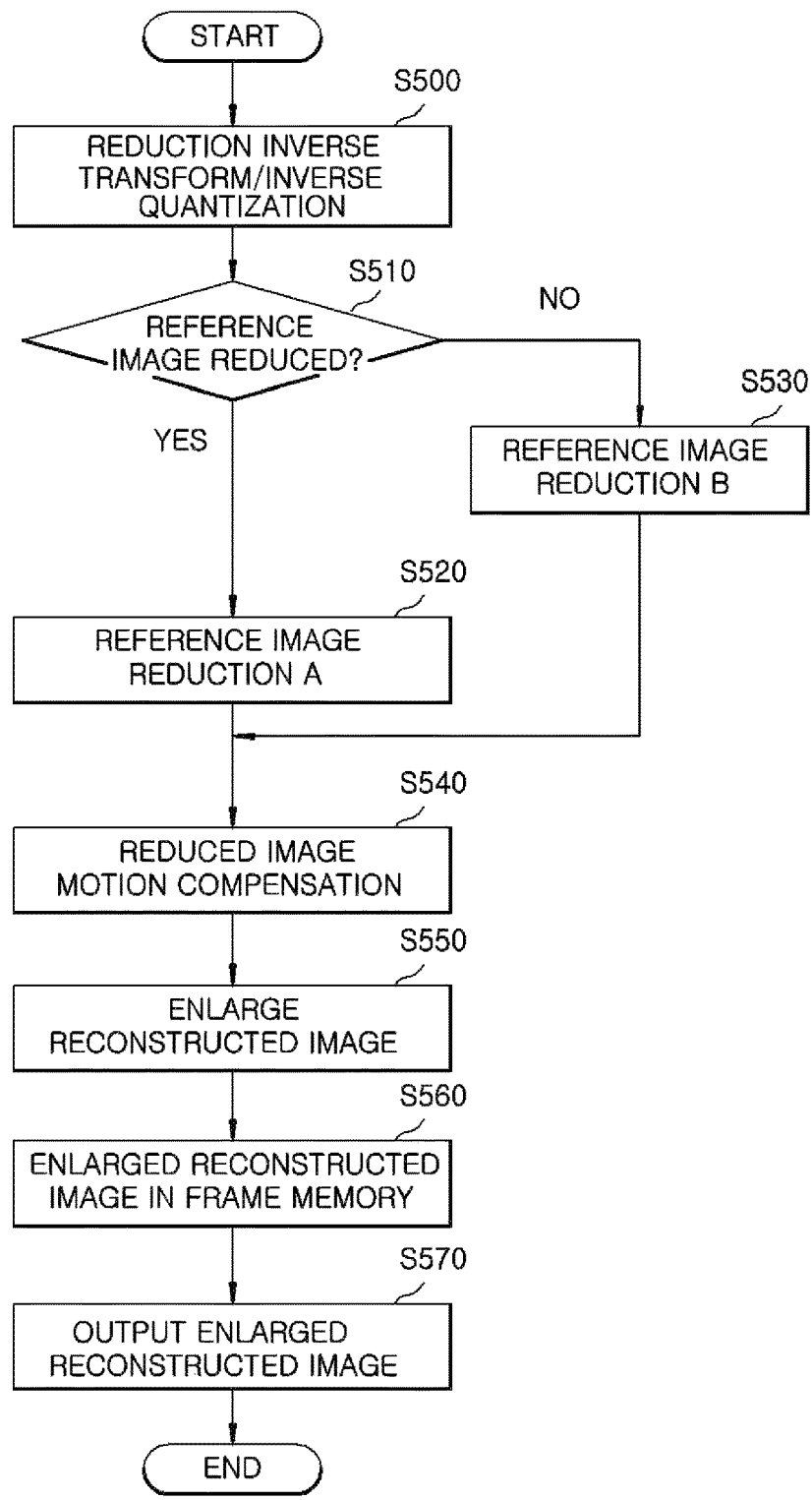
FIG. 18 is a flowchart of decoding process D shown in step S170 of FIG. 14.

Next, the decoding process D will be described with reference to FIG. 18. FIG. 18 is a flowchart of the decoding process D shown in step S170 of FIG. 14. The decoding process D is a decoding process of a region where the motion vector has been reduced when all frames have been reduced.

As shown in FIG. 18, in the decoding process D, the inverse transform/inverse quantization unit 33 performs reduction inverse transformation and inverse quantization to generate a difference image of the reduced region (S500). In the reduction inverse transformation and inverse quantization, similarly to the decoding process B of FIG. 16, inverse transformation and inverse quantization of 4 vertical pixels×4 horizontal pixels are performed from the coefficients of 8 vertical pixels×8 horizontal pixels.

As a result, a reconstructed difference image which has been reduced to, e.g., 8 vertical pixels×8 horizontal pixels, is generated.

Then, the motion compensation unit 35 determines whether the reference image has been reduced (S510). If the reference image has been reduced (Yes in step S510), the reference image enlargement/reduction unit 39 reduces the reference image by reference image reduction A (S520). The reference image reduction A is a process of reducing the reference image to ½ vertically and horizontally.

Further, if the reference image has not been reduced (No in step S510), the reference image enlargement/reduction unit 39 reduces the reference image by reference image reduction B (S530). The reference image reduction B is a process of reducing the reference image to ¼ vertically and horizontally.

Then, the motion compensation unit 35 performs a reduced image motion compensation process using the corresponding region of the reference image by using the reduced motion vector extracted by the variable length decoding unit 31 (S540), and generates a reconstructed image by the pixel sum of the reconstructed difference image.

Then, the reconstructed image enlargement unit 37 enlarges the reconstructed image (S550), and stores the enlarged reconstructed image in the frame memory (S560).

Further, the motion compensation unit 35 outputs the reconstructed image to the image enlargement unit 36, and the image enlargement unit 36 enlarges the reconstructed image to its original size and outputs the enlarged reconstructed image (S570).

In this manner, the decoding process D is carried out.

Examples of the image size to be processed by the third image processing device will be described briefly with reference to FIG. 19. FIG. 19 is an explanatory diagram showing examples of the image size to be processed by the third image processing device. FIG. 19 shows the image sizes obtained by a combination of the presence or absence of frame reduction and the presence or absence of motion vector reduction in the processing of the encoding processor.

As shown in FIG. 19, "MB (macroblock) size" is the size of the region divided in the image region dividing unit 14 or the reduced image region dividing unit 13, and is 16 vertical pixels×16 horizontal pixels in each case.

"Size during MC (motion compensation)" indicates the size of the region when the motion search unit 16 or the reduced image motion search unit 15 performs a motion search process such as block matching.

In a case where the reduction of the motion vector is not performed, the reduction of the region is not performed and the region is processed at a size of 16 vertical pixels×16 horizontal pixels in the motion search unit 16.

In a case where the reduction of the motion vector is performed, the input macroblock is processed after being reduced to a size of 8 vertical pixels×8 horizontal pixels in the reduced image motion search unit 15.

"Size in original image" is the original size of the macroblock, and is equal to the macroblock size (16 vertical pixels×16 horizontal pixels) if the frame reduction is not performed and is 32 vertical pixels×32 horizontal pixels if the frame reduction is performed.

"Reconstructed difference image" is the size of the reconstructed image in the reconstructed image generating unit 22, and is 8 vertical pixels×8 horizontal pixels regardless of the presence or absence of frame reduction when the reduction of the motion vector is performed.

"No reference image reduction" represents the size of the reference image stored in the frame memory when the reference image read is not reduced and the size of the reference image when read, in the reduced image motion search unit 15 or the motion search unit 16.

Similarly, "Reference image reduction" represents the size of the reference image stored in the frame memory when the reference image read is reduced and the size of the reference image when read, in the reduced image motion search unit 15 or the motion search unit 16.

Regardless of the presence or absence of reduction of the reference image, the image is read after being enlarged/reduced to 16 vertical pixels×16 horizontal pixels if the motion vector has not been reduced, and the image is read after being reduced to 8 vertical pixels×8 horizontal pixels if the motion vector has been reduced.

According to the image processing device in accordance with the third embodiment of the present invention, the encoding processor calculates an evaluation value of the complexity of each frame, and performs reduction of all frames if the evaluation value is smaller than a first threshold value. If the evaluation value is equal to or greater than the threshold value, the encoding processor, without performing reduction of all frames, divides the reduced frame or the non-reduced frame into regions having a predetermined size, and calculates a motion vector mode selection evaluation value indicating the complexity of the region. The encoding processor performs encoding such that reduction of the motion vector is performed if the motion vector mode selection evaluation value is smaller than a second threshold value and reduction of the motion vector is not performed if the motion vector mode selection evaluation value is equal to or greater than the second threshold value. The decoding processor performs a decoding process by selecting an appropriate one among four decoding processes for each region according to a combination of the presence or absence of frame reduction and the presence or absence of motion vector reduction. For a complex image region, image transmission is performed without reducing the amount of information to prevent a deterioration in image quality. At the same time, for a non-complex image region, the reduction of the motion vector and all frames is performed to greatly reduce the amount of header information. Thus, it is possible to improve the compression ratio by performing appropriate encoding/decoding for each region. Particularly, an image whose complexity varies with time can be efficiently encoded.

INDUSTRIAL APPLICABILITY

The present invention is applicable to an image processing device which can reproduce a high-quality image on the reception side even when transmitted at a low bandwidth, and also applicable to an image processing device which can improve a compression rate in encoding.

EXPLANATION OF REFERENCE SYMBOLS

1, 200, 300: image input IF unit
2, 201, 301: low pass filter 3, 221, 321: super-resolution processing unit
4, 212, 312: encoding unit
11: complex image region search unit
12, 24, 302: image reducing unit
13: reduced image region dividing unit
14: image region dividing unit
15: reduced image motion search unit
16: motion search unit
17: transform/quantization unit
18: reduced image transform/quantization unit
19: motion vector mode selection unit
20: variable length encoding unit
21: inverse transform/inverse quantization unit
22: reconstructed image generating unit
23, 38: frame memory
25: image enlargement unit
31: variable length decoding unit
32: image size determination unit
33: inverse transform/inverse quantization unit
34: motion vector mode determination unit
35: motion compensation unit
36: image enlargement unit
37: reconstructed image enlargement unit
39: reference image enlargement/reduction unit
202: image reduction unit
203, 218: complexity calculation unit
204: multiplexer
211, 311: control unit
215, 304: demultiplexer
216, 316: decoding unit
217, 317: image enlargement unit
219: complexity comparison unit
220, 320: parameter calculation unit
303, 319: complexity table processing unit

What is claimed is:

1. An image processing device comprising an image compression unit for compressing an input image, and an image decompression unit for decompressing the compressed image for output,
wherein the image compression unit includes:
a low pass filter configured to limit a bandwidth of an input image signal based on a preset cutoff frequency;
an image reduction unit configured to reduce an output signal from the low pass filter according to a preset reduction factor;
an encoding unit configured to encode an output signal from the image reduction unit;
a first complexity calculation unit configured to calculate at least one first parameter indicating image complexity for the input image signal;
a control unit configured to set a reduction factor corresponding to a pre-stored cutoff frequency in the image reduction unit while setting another cutoff frequency for limiting a bandwidth by cutting components above a specific frequency in the low pass filter, based on the first parameter; and
a multiplexer configured to multiplex the first parameter and an encoded stream outputted from the encoding unit for output, and
wherein the image decompression unit includes:
a demultiplexer configured to extract the encoded stream and the first parameter from an input signal; a decoding unit configured to decode the encoded stream;
an image enlargement unit configured to enlarge an output signal from the decoding unit according to a specified enlargement factor;

a super-resolution processing unit configured to perform a super-resolution process on the enlarged image using a specified folding frequency;
a second complexity calculation unit configured to calculate at least one second parameter indicating image complexity for the enlarged image;
a complexity comparison unit configured to calculate a difference or a ratio between the first parameter and the second parameter; and
a parameter calculation unit configured to set another folding frequency for removing aliasing components using the calculated second parameter in the super-resolution processing unit while setting an enlargement factor corresponding to a pre-stored second parameter in the image enlargement unit, based on the difference or the ratio.

2. The image processing device of claim 1, wherein in the image compression unit, the image reduction unit performs reduction of an entire frame when the first parameter is smaller than a preset first threshold value, and does not perform reduction of the entire frame when the first parameter is equal to or greater than the preset first threshold value, and the encoding unit calculates a parameter indicating a complexity for each of divided regions of the input image regardless of performing the reduction of the entire frame, performs encoding with reducing a region for which the parameter is smaller than a preset second threshold value, and performs encoding without reducing a region for which the parameter is equal to or greater than the preset second threshold value, and
wherein in the image decompression unit, the decoding unit performs decoding each of regions according to whether reduction of said each region and reduction of the entire frame has been performed or not in the image compression unit.

3. A moving image transmission method using an image compression unit for compressing an amount of data of an input moving image and an image decompression unit for restoring a compressed moving image in which the amount of data has been compressed to an original moving image, the method comprising:
in the image compression unit,
a bandwidth limiting step of limiting a bandwidth of an input image signal based on a preset cutoff frequency by a low pass filter of the image compression unit;
a reduction step of reducing an output signal from the low pass filter according to a preset reduction factor;
an encoding step of encoding an output signal from the reducing;
a first calculation step of calculating, for the input image signal, a first parameter indicating image complexity for each of divided regions of the image;
a first control step of setting a reduction factor corresponding to a ore-stored cutoff frequency in the image reduction unit while setting another cutoff frequency for limiting a bandwidth by cutting components above a specific frequency in the low pass filter based on the first parameter; and
a multiplexing step of multiplexing the first parameter and an encoded stream outputted from the encoding step for output,
in the image decompression unit,
a demultiplexing step of extracting the encoded stream and the first parameter from a signal inputted to the image decompression unit;
a decoding step of decoding the encoded stream;

an enlargement step of enlarging an output signal from the decodng step according to a specified enlargement factor;
a super-resolution step of performing a super-resolution process on the enlarged image using a specified folding frequency;
a second calculation step of calculating a second parameter indicating an image complexity for the enlarged image;
a comparison step of calculating a difference or a ratio between the first parameter and the second parameter; and
a setting step of setting another folding frequency for removing aliasing components using the second parameter calculated in the super-resolution step while setting an enlargement factor corresponding to a ore-stored second parameter in the enlargement step based on the difference or the ratio, wherein, in the reduction step, performing reduction of an entire frame when the first parameter is smaller than a preset first threshold value, and not performing reduction of the entire frame when the first parameter is equal to or greater than the preset first threshold value, wherein, in the encoding step, performing encoding with reducing a region for which the first parameter is smaller than a preset second threshold value, and performing encoding without reducing a region for which the parameter is equal to or greater than the preset second threshold value, and wherein, in the decoding step, performing decoding each of regions according to whether reduction of said each region and reduction of the entire frame has been performed or not in the image compression unit.

* * * * *